United States Patent
Corinella

(10) Patent No.: US 9,940,118 B2
(45) Date of Patent: Apr. 10, 2018

(54) SYSTEMS AND METHODS UTILIZING HIGHLY DYNAMIC WIRELESS AD-HOC NETWORKS

(71) Applicant: Dahrwin LLC, Wilmington, DE (US)

(72) Inventor: Justin Tyler Corinella, Brooklyn, NY (US)

(73) Assignee: DAHRWIN LLC, Wilmington, DE (US)

( * ) Notice: Subject to any disclaimer, the term of this patent is extended or adjusted under 35 U.S.C. 154(b) by 0 days.

(21) Appl. No.: 14/156,214

(22) Filed: Jan. 15, 2014

(65) Prior Publication Data
US 2014/0196025 A1    Jul. 10, 2014

Related U.S. Application Data

(63) Continuation-in-part of application No. 13/403,966, filed on Feb. 23, 2012, now Pat. No. 8,774,147.
(Continued)

(51) Int. Cl.
*G06F 9/445* (2018.01)
*H04W 76/02* (2009.01)
(Continued)

(52) U.S. Cl.
CPC .............. *G06F 8/61* (2013.01); *H04W 4/001* (2013.01); *H04W 4/206* (2013.01); *H04W 76/02* (2013.01); *H04W 84/18* (2013.01)

(58) Field of Classification Search
CPC ..... H04W 76/02; H04W 4/206; H04W 4/001; H04W 4/00; H04W 84/18; H04W 40/248;
(Continued)

(56) References Cited

U.S. PATENT DOCUMENTS

| 6,816,460 | B1 | 11/2004 | Ahmed et al. |
| 7,388,869 | B2 | 6/2008 | Butehorn et al. |

(Continued)

FOREIGN PATENT DOCUMENTS

| WO | 2010022185 A1 | 2/2010 |
| WO | 2010028311 A1 | 3/2010 |

(Continued)

OTHER PUBLICATIONS

International Search Report of PCT/US2014/016206, dated Jun. 3, 2014.
(Continued)

*Primary Examiner* — Andrew Chriss
*Assistant Examiner* — Rasha Fayed
(74) *Attorney, Agent, or Firm* — Amster, Rothstein & Ebenstein, LLP

(57) ABSTRACT

Systems and methods for propagating a mesh network are disclosed. In embodiments, an API for participation in a mesh network stored on a first device may be distributed without a central provider. The presence of the first device may be detected on a second mobile device. The second mobile device may wirelessly connect to the first device. A web browser application may be accessed on the second mobile device and used to access a DNS implementation on the first device. The second mobile device may submit a request for an API from the first device. The API from the first device may be downloaded and installed at the second mobile device. The second mobile device, using the installed API, may connect to and communicate with the first device.

22 Claims, 20 Drawing Sheets

Related U.S. Application Data

(60) Provisional application No. 61/868,404, filed on Aug. 21, 2013, provisional application No. 61/772,510, filed on Mar. 4, 2013, provisional application No. 61/764,586, filed on Feb. 14, 2013, provisional application No. 61/764,450, filed on Feb. 13, 2013, provisional application No. 61/752,501, filed on Jan. 15, 2013.

(51) Int. Cl.
*H04W 4/00* (2018.01)
*H04W 4/20* (2018.01)
*H04W 84/18* (2009.01)

(58) Field of Classification Search
CPC ........ H04W 8/26; H04W 80/00; H04L 12/28; H04L 12/56; H04L 12/2805; H04L 12/2809; H04L 12/2856; H04L 12/2898; H04L 45/52; H04L 45/123; H04L 61/25; H04L 61/1511; H04L 61/2092; H04L 61/303; H04L 61/2023; H04L 29/1233; H04L 29/12066; H04L 29/12594; H04L 29/1232; H04L 29/12235; H04L 67/025; H04L 67/14; H04L 67/125; H04L 67/02; H04L 67/16; H04L 47/2408; H04L 69/329
USPC ........ 717/178; 370/238, 351, 338, 389, 401, 370/254; 709/203, 220
See application file for complete search history.

(56) References Cited

U.S. PATENT DOCUMENTS

| | | |
|---|---|---|
| 7,403,492 B2 | 7/2008 | Zeng et al. |
| 7,463,907 B2 | 12/2008 | Smith et al. |
| 7,613,458 B2 | 11/2009 | Roberts |
| 7,619,999 B2 | 11/2009 | DaCosta |
| 7,636,343 B2 | 12/2009 | Mizukoshi |
| 7,649,884 B1 | 1/2010 | Ahmed et al. |
| 7,697,893 B2 | 4/2010 | Kossi et al. |
| 7,720,037 B2 | 5/2010 | Bill |
| D626,072 S | 10/2010 | Tseng et al. |
| 7,831,206 B2 | 11/2010 | Dupcinov et al. |
| 7,924,747 B2 | 4/2011 | McNeill et al. |
| 7,969,952 B2 | 6/2011 | Sin |
| 7,974,234 B2 | 7/2011 | Gustave et al. |
| 7,983,207 B2 | 7/2011 | Lai et al. |
| 7,984,132 B2 | 7/2011 | Park et al. |
| 8,031,083 B2 | 10/2011 | Sendrowicz |
| 8,060,017 B2 | 11/2011 | Schlicht et al. |
| 8,068,454 B2 | 11/2011 | Bonta et al. |
| 8,135,655 B2 | 3/2012 | Oaten et al. |
| 8,230,108 B2 | 7/2012 | Pratt, Jr. et al. |
| 8,274,928 B2 | 9/2012 | Dykema et al. |
| 8,279,778 B2 | 10/2012 | Shuey |
| 8,401,016 B2 | 3/2013 | Li |
| 8,483,196 B2 | 7/2013 | Wang et al. |
| 8,774,147 B2 | 7/2014 | Corinella et al. |
| 9,338,725 B2 | 5/2016 | Corinella |
| 2003/0204625 A1 | 10/2003 | Cain |
| 2005/0058108 A1 | 3/2005 | Ekberg et al. |
| 2006/0073839 A1 | 4/2006 | Gorday et al. |
| 2006/0098609 A1 | 5/2006 | Henderson et al. |
| 2006/0126524 A1* | 6/2006 | Tateson ................... H04L 45/02 370/252 |
| 2006/0133328 A1 | 6/2006 | Levendel et al. |
| 2006/0218225 A1 | 9/2006 | Hee Voon et al. |
| 2006/0234631 A1 | 10/2006 | Dieguez |
| 2006/0268879 A1 | 11/2006 | Xhafa et al. |
| 2006/0271626 A1* | 11/2006 | Tidwell ............... H04L 65/1093 709/204 |
| 2007/0033257 A1 | 2/2007 | Nakajima et al. |
| 2007/0099634 A1* | 5/2007 | Chari .................. H04L 67/2804 455/456.3 |
| 2007/0211714 A1* | 9/2007 | Metke ............... H04L 29/12066 370/389 |
| 2007/0214283 A1 | 9/2007 | Metke et al. |
| 2008/0031203 A1 | 2/2008 | Bill |
| 2008/0310340 A1* | 12/2008 | Isozu ...................... H04L 45/10 370/328 |
| 2009/0046732 A1* | 2/2009 | Pratt, Jr. ................. H04L 12/66 370/406 |
| 2009/0129316 A1* | 5/2009 | Ramanathan ......... H04L 45/123 370/328 |
| 2009/0154481 A1 | 6/2009 | Han et al. |
| 2010/0226284 A1 | 9/2010 | Bill |
| 2011/0034176 A1 | 2/2011 | Lord et al. |
| 2011/0122798 A1 | 5/2011 | Hughes et al. |
| 2011/0143757 A1 | 6/2011 | Oh et al. |
| 2011/0182205 A1* | 7/2011 | Gerdes ................ H04L 12/2818 370/254 |
| 2011/0222515 A1 | 9/2011 | Wang et al. |
| 2011/0300943 A1* | 12/2011 | Devine ............... H04L 29/1232 463/42 |
| 2012/0105214 A1 | 5/2012 | Sanders |
| 2012/0316941 A1 | 12/2012 | Moshfeghi |
| 2013/0007499 A1* | 1/2013 | Moy ..................... G06F 3/1423 713/400 |
| 2013/0013809 A1 | 1/2013 | Vasseur et al. |
| 2013/0070745 A1* | 3/2013 | Nixon ..................... H04L 45/74 370/338 |
| 2013/0114482 A1 | 5/2013 | Oh et al. |
| 2013/0170393 A1 | 7/2013 | Bill |
| 2013/0170394 A1 | 7/2013 | Bill |
| 2013/0194970 A1 | 8/2013 | Bill |
| 2013/0195095 A1 | 8/2013 | Bill |
| 2013/0208714 A1 | 8/2013 | Bill |
| 2014/0233496 A1 | 8/2014 | Corinella et al. |

FOREIGN PATENT DOCUMENTS

| | | |
|---|---|---|
| WO | 2011112716 A1 | 9/2011 |
| WO | 2014127104 A2 | 8/2014 |

OTHER PUBLICATIONS

Written Opinion of PCT/US2014/016206, dated Jun. 3, 2014.
Kickstarter, Zuli Smartplugs by Zuli Inc., https://www.kickstarter.com/projects/zuli/zuli-smartplugs (last accessed Aug. 7, 2014).
Kickstarter, The Luminode: An Evolutionary Leap in Smart Home Technology by Think Automatic, https://www.kickstarter.com/projects/787856320/the-luminode-an-evolutionary-leap-in-smart-home-te?ref=discovery (last accessed Aug. 7, 2014).
Williams, Martyn, "Facebook eyes making local connections with mesh networks," Computerworld (Aug. 16, 2013).
Hui, Jonathan W. et al., "Extending IP to Low-Power, Wireless Personal Area Networks," Internet Computing, IEEE vol. 12, Issue 4 (Jul.-Aug. 2008).

* cited by examiner

T305:

T310:

T315:

T320:

S1002: On a second mobile device, detect presence of a network from a first device.

S1004: Wirelessly connect the second mobile device to the first device.

S1006: Access, on the second mobile device, a web browser application.

S1008: Access, on the second mobile device, a DNS implementation on the first device.

S1010: Receive, at the second mobile device, a splash screen from the first device for display in the web browser on the second mobile device.

S1012: Request, at the second mobile device, an API from the first device.

S1014: Download, at the second mobile device, the API from the first device.

S1016: Install the API on the second mobile device

S1018: Connect, using the installed API, the second mobile device to the first device.

FIG. 10A

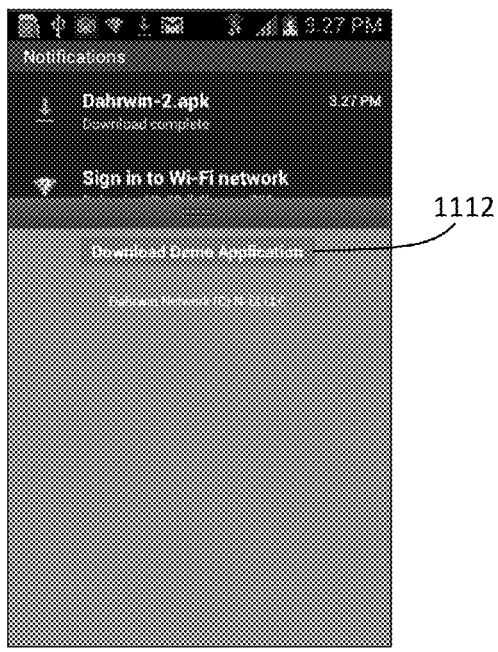
FIG. 11E
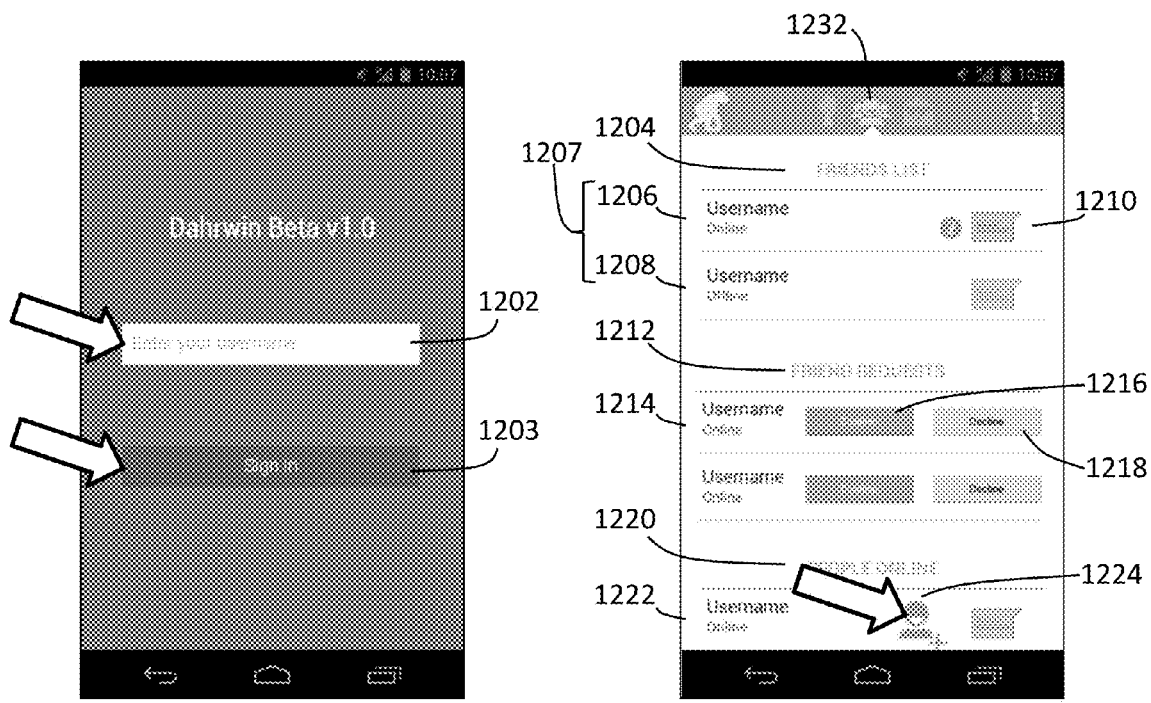
FIG. 12A
FIG. 12B

SYSTEMS AND METHODS UTILIZING HIGHLY DYNAMIC WIRELESS AD-HOC NETWORKS

CROSS REFERENCE TO RELATED APPLICATIONS

This application claims priority to U.S. Provisional Patent Application No. 61/868,404, filed Aug. 21, 2013, U.S. Provisional Patent Application No. 61/772,510, filed Mar. 4, 2013, U.S. Provisional Patent Application No. 61/764,586, filed Feb. 14, 2013, U.S. Provisional Patent Application No. 61/764,450, filed Feb. 13, 2013, and U.S. Provisional Patent Application No. 61/752,501, filed Jan. 15, 2013, the contents of each of which are incorporated herein in their entirety. This application further claims priority as a continuation-in-part to U.S. Non-Provisional patent application Ser. No. 13/403,966, filed Feb. 23, 2012, the contents of which are incorporated herein in their entirety.

FIELD

The disclosure generally relates systems, methods and devices for deploying a highly dynamic wireless ad-hoc network. In embodiments, the systems, methods and devices can function autonomously, in which all network nodes share the same role functions based on their capabilities. In embodiments, the disclosure also generally relates to various applications than can be deployed on such a network.

SUMMARY

The disclosure generally relates systems, methods and devices for deploying a highly dynamic wireless ad-hoc network.

In exemplary embodiments, a wireless ad hoc mesh network may be implemented. The wireless ad hoc mesh network may include a plurality of nodes which can function autonomously and where each node shares the same functionalities or capabilities. The nodes may each act as client/server so as to be able to perform all the routing functions of the mesh network. The mesh network may transmit data through multiple paths. The mesh network may further transmit data by splitting a packet stream into fragmented packets and routing the packets through multiple alternating paths.

In exemplary embodiments, an API for participation in a mesh network stored on a first device may be distributed without a central provider. The distribution of such an API may propagate a mesh network. The presence of a first device may be detected on a second mobile device. The second mobile device may wirelessly connect to the first device. A web browser application may be accessed on the second mobile device. Using the web browser on the second mobile device, a DNS implementation on the first device may be accessed on the second mobile device. The second mobile device may receive display data from the first device for display in the web browser on the second mobile device. The display data may comprise or otherwise be used to generate a splash screen or other graphical user interface. The second mobile device may submit an electronic request for a machine-readable API from the first device, which may be stored in first device memory of the first device. The machine-readable API from the first device may be downloaded at the second mobile device and stored in second device memory. The machine-readable API may be installed on the second mobile device to be run on one or more processors.

In embodiments, the second mobile device, using the installed machine-readable API, may connect via a wireless connection to the first device.

In embodiments, the second mobile device, using the installed machine-readable API, may connect via a wireless connection to a third device.

In embodiments, the process can be repeated, e.g., with a third mobile device and the second mobile device, to distribute the API from the second device to the third device. Accordingly, the API may be distributed to any number of available devices, such as a third device, a fourth device, etc. The API may be distributed from any device having the API to any device not yet having the API or not yet having the same version of the API.

In embodiments, any device with the API installed may communicate with any other device having the API installed and/or within range (e.g., transmission distance) of nodes in the resulting mesh network.

In embodiments, the second mobile device may communicate with the first device using the installed machine-readable API.

In embodiments, the second mobile device may communicate with a third device using the installed machine-readable API.

In embodiments, the second mobile device may receive from the first device using the installed machine-readable API, an advertisement.

In embodiments, the first device may be any of a mobile phone, smart phone, personal digital assistant, wearable electronic device, music player device, calculator device, gaming console, television, stereo, wall-charging unit, DC power node, light bulb, laptop computer, desktop computer, tablet device, interactive appliance, navigation device, drone, and/or interactive billboard.

In embodiments, the second mobile device may be a cell phone, smartphone, personal digital assistant ("PDA"), wearable electronic device, portable computer, laptop computer, tablet computer, GPS device, music player device, portable video game system, gaming console, calculator device, wall-unit node, DC power node, special purpose device, and/or drone to name a few.

In embodiments, the wireless connection may be created via at least one of Wi-Fi, Wi-Fi Direct, Bluetooth, Bluetooth Low Energy, near field communication, infrared, microwave, radio wave, and/or cellular data.

In embodiments, the application programming interface may comprise any of a game, a communications platform, an information access platform, an information receiving platform, an advertising platform, a social media application, and/or a platform to access and/or provide mesh capabilities to non-mesh third party applications.

In embodiments, a mesh network may be propagated from a first device having an API stored on a removable memory device. A second device may detect a mesh network from a first device. The second device may connect to the first device via a wireless connection. The second device may send to the first device an electronic request for a machine-readable API stored in removable memory of the first device. The second device may download into second device memory of the second device the machine-readable API from the first device. The second device may install the machine-readable API to be run on one or more processors of the second device. The second device may connect to the first device via the wireless connection using the installed machine-readable API.

In embodiments, the first device may be a gaming console, wall-charging unit, DC power node, light bulb, desktop computer, interactive appliance, navigation device, drone, and/or interactive billboard.

In embodiments, the second device may be any of a mobile phone, smart phone, personal digital assistant, wearable electronic device, music player device, calculator device, gaming console, wall-charging unit, DC power node, light bulb, laptop computer, desktop computer, tablet device, interactive appliance, navigation device, drone, and/or interactive billboard.

In embodiments, wherein the removable memory device of the first device can comprise any of an SD card, Micro SD card, USB drive, flash memory device, and/or solid state memory device.

In exemplary embodiments, a node of the mesh network can comprise an application layer, an application controller and routing libraries, and a network controller. The application layer may contain one or more individual applications which utilize the mesh network. The applications can pass a set of prioritized attributes to the application controller. The application controller may correlate the application's set of desired attributes, so as to implement the appropriate routing protocol which may be contained inside of a Protocol Library. The routing protocols implemented may include, for example, proactive, reactive, hybrid, delay tolerant store and forward mechanisms, neural networks, graph partitioning schemes, Redundant Dynamic Protocol, to name a few.

In exemplary embodiments, the network controller may actively maintain a full or partially distributed asynchronous network topology, which may include tracking the overall state of the network, monitoring bandwidth usage by overlying third party applications, and providing neighbor quality evaluations (based off connection qualities, self-evaluations, and relevant time function) for each node.

In exemplary embodiments, the components (e.g., the application layer, the application controller, and the network controller) may interact with each other, and one or more third party applications through an interface. The framework of the mesh network allows components to be added or deleted easily. The mesh network may be implemented as downloadable platform.

In exemplary embodiments, the network may implement redundant and parallel gateway mechanisms by utilizing, for example, multiple backhaul nodes concurrently.

In exemplary embodiments, the network may provide location based services, by utilizing, for example, radio wave propagation, GPS, and triangulation, to name a few.

In exemplary embodiments, the application-oriented virtual subnets may be utilized to implement social profiling and advertising, by utilizing, for example, predefined templates and/or available social networking data.

In exemplary embodiments, the network may implement security mechanism, including, for example, MAC Address spoofing, public/private key encryption, and/or data transmission thresholds.

In exemplary embodiments, the mesh network may be used in applications, such as, for example, chatting applications, social network/social discovery applications, multiplayer gaming, utility applications (e.g., lighting), vehicular/automotive (e.g., collision avoidance), resource and media sharing, information and activity collaboration, network gaming, personal/consumer crowd sourcing, business social media, military, transportation, utilities, public education, healthcare, commercial monitoring, safety, and control systems, hospitality, wireless enterprise, municipal networks, general bypass and extensions of mobile, broadband, and Wi-Fi networks, to name a few.

In exemplary embodiments, the node devices may be self-autonomous relay node devices. The nodes may include card readers, such as one or more SD card readers, and one or more wireless cards (e.g., SD cards). A node may include a card reader custom built to fit and be powered by a wall socket and the like. The card reader can read and execute the instructions of from an inserted SD card. In some embodiments an SD card can be used that includes a slot that accepts a separate wireless card, such as, a wireless micro SD card. The card reader with the SD card can access and therefore send/receive data via the radios of both the SD and micro SD cards.

In exemplary embodiments, the nodes may be used in a variety of settings such as an office environment to provide connectivity between devices such as desktops, laptops, monitors, printers, and the like, as well as function as relays in the wireless mesh network.

DESCRIPTION OF THE DRAWINGS

The features and advantages of the present disclosure will be more fully understood with reference to the following, detailed description when taken in conjunction with the accompanying figure, wherein:

FIG. 10A is a flow chart of a process for obtaining an API for connecting mobile devices according to an exemplary embodiment of the present invention.

FIGS. 11A-E are exemplary screen shots of a process to obtain an API for connecting mobile devices according to an exemplary embodiment of the present invention.

FIGS. 12A-D are exemplary screen shots of an application for management of neighboring devices in a mesh network according to an exemplary embodiment of the present invention.

DETAILED DESCRIPTION

A mesh network can comprise decentralized end-user relay nodes which are capable of functioning autonomously from other networks, including internet service providers, or any other third party or subsidiary systems e.g., any type of access points or routers. Every node in the mesh network may share identical role functionality, allowing each device to act as both a client and a server concurrently.

In a mesh network data may be transmitted in a multi-hop routing scheme such as across multiple routes. Each individual node may search for neighboring nodes and evaluate the connection quality with each neighbor node. For each node, the connection evaluations of each neighbor node may be stored in a node evaluation table, which may be stored in device memory. The evaluation table can be used in determining how to route data through the mesh network. The evaluations may be measured based on signal strength, connection data rate, retransmission rate, packet loss ratio, and other factors for each neighboring node/device. Each node can prioritize neighbors based on the evaluations stored in the node evaluation table. Each node's evaluation table can be shared with its neighboring nodes via communication or data transfer protocols, such as Wi-Fi, Bluetooth, or cellular data, to name a few.

Functional abilities of each node can be determined and exchanged with neighbors, including, for example, the current battery life, the wireless media that are currently in use or available, hardware components and device capabilities, and/or third-party resources, such as GPS, speedometers, or accelerometers to determine position, speed, or acceleration, to name a few.

Additionally, various time functions for each node may be determined and shared with neighbor nodes, including the total time the node/device is connected to the mesh network, the time spent connected to a specific neighbor, and the time spent performing certain role functions. These functions can be analyzed for determining the path along which to route data.

GPS-enabled nodes may use the physical location of the destination node to determine to which neighboring nodes redundant packets will be sent.

Data transmitted through the mesh network may be fragmented into packets, with different packets sent along different routes within the mesh network. The mesh network may also implement load balancing techniques through using different backbone and different backhaul nodes. Further data packets transmitted through the mesh network can be encrypted.

Every node/device has a unique identification code which is used both for identification of a device as well as to target data to a specific destination device.

Some nodes/devices, may be connected to other networks, such as the Internet and the like to provide the mesh network with a gateway to such networks.

Figure 1:
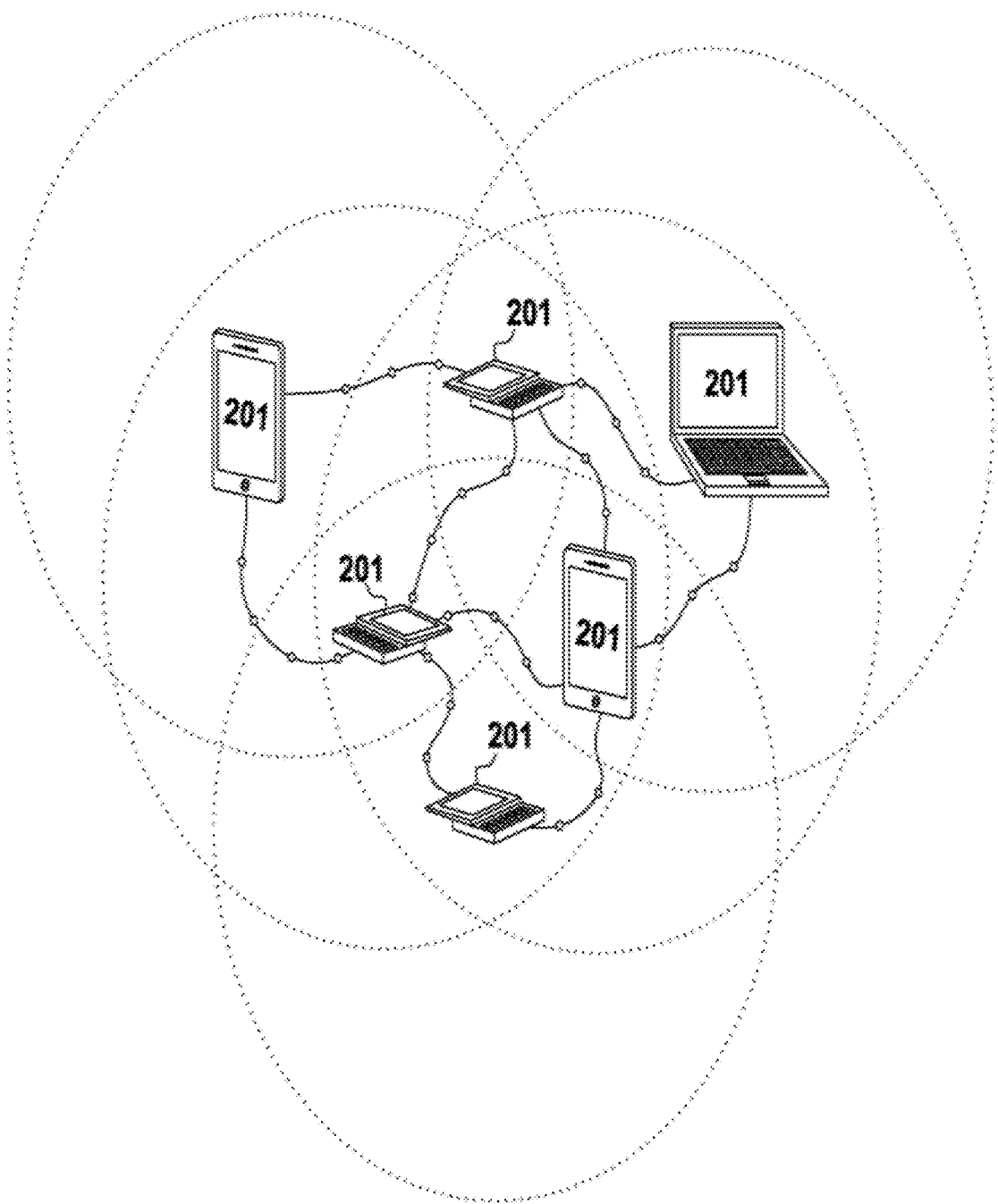
FIG. 1 illustrates a diagram of an exemplary wireless network architecture.

In exemplary embodiments, a dynamic wireless ad-hoc network can function autonomously, wherein all network nodes may share the same role functions based on their capabilities. These nodes can isolate networking functionalities from overlying applications, thus being able to perform many routing schemes concurrently based on application needs, functionality of the node, and quality of neighbor. FIG. 1 is a visual example of mesh network, where the user devices 201 are nodes in the mesh network.

Routing

Communications in a highly dynamic distributed mesh network may include one or more routing protocols. Some routing protocols may be designed to optimize a very particular aspect, concurrent utilization of multiple protocols for different applications will allow for robust capabilities in highly mobile, asynchronous networks with an inherently stochastic topology. For example, being able to maintain a mesh network in Grand Central Station (or some other heavily trafficked area), with a large amount of moving people with mobile devices.

In exemplary embodiments, each node is client/server and performs all routing functionalities within the network and may allow multiple hops between nodes on the network.

In some exemplary embodiments, the network functions in an entirely distributed communications system, and may implement a naïve topology awareness, where each node is not directly responsible for maintaining a full table of the entire network topology. This differs from other networks which have high overhead caused by keeping up-to-date routing information while in a constantly changing and unpredictable (highly dynamic and stochastic) network. For example, the nodes in the exemplary network may only be responsible for maintaining an up-to-date list of their direct neighbors (single-hop) to decrease amount of control packet overhead. This can allow for large, dense, highly mobile networks that have constantly moving nodes.

In exemplary embodiments, the network may perform alternating routing, wherein data is transmitted through the network over multiple independent routes to the same destination node. In this regard, by splitting the packet stream into alternating packets and routing them through multiple paths, this enables optimized throughput for large data streams, such as multimedia for example. Further, in embodiments, the network may be capable of fragmented packet propagation, wherein packets are split into fragments and distributed using routing techniques including the aforementioned alternating routing. This functionality may provide a layer of security, ensuring that no single intermediate node is capable of intercepting entire data streams in communications between source and destination nodes.

In exemplary embodiments social behavior in dynamic ad-hoc mesh networks may be exploited, for example, by implementing one or more routing protocols using explicit knowledge of relationships (e.g., friends on Facebook, connections on LinkedIn, followers on Twitter, shared check-ins on Foursquare, etc.). Such protocols may route between neighboring devices (e.g., mobile users) which can be inferred either from contact libraries and/or explicitly declared relationships.

Further in some embodiments routing protocols may be implemented without knowledge of explicit relationship ties for communication and data dissemination uses. In some embodiments, one or more routing protocols may be implemented by utilizing store and forward mechanisms. For example in an exemplary store and forward mechanism, if a device (e.g., a node) loses communication to the network, the device will store the last received packet until it re-enters the range of communication with another qualifying device of the network. Such store and forward mechanisms may help to reduce partitioning issues or problems in highly dynamic networks. In other words, nodes/devices may store one or more queued packets for one or more periods of time until the device reconnects with the network in a suitable manner at a later time, for example by propagating the packet to suitable candidates devices/nodes. Suitable candidate nodes can be nodes that are within a predefined or threshold distance, and/or other devices (nodes) outside or farther than the predefined or threshold distance but which are determined to be moving towards the previously disconnected device. In embodiments, various methods may be used for selecting candidate nodes. An exemplary approach for selecting a good candidate device may be based on evaluating application relevant parameters of the candidate device by means of evaluating, for example, social content, activities, occupation, interests, locations, and relationships, to name a few. For example, a candidate may be selected based on a person associated with a candidate device has commonality with respect to check-ins, interests/hobbies, and the like. This information may be pulled from social networks, or may be retrieved locally from the device.

Figure 6:
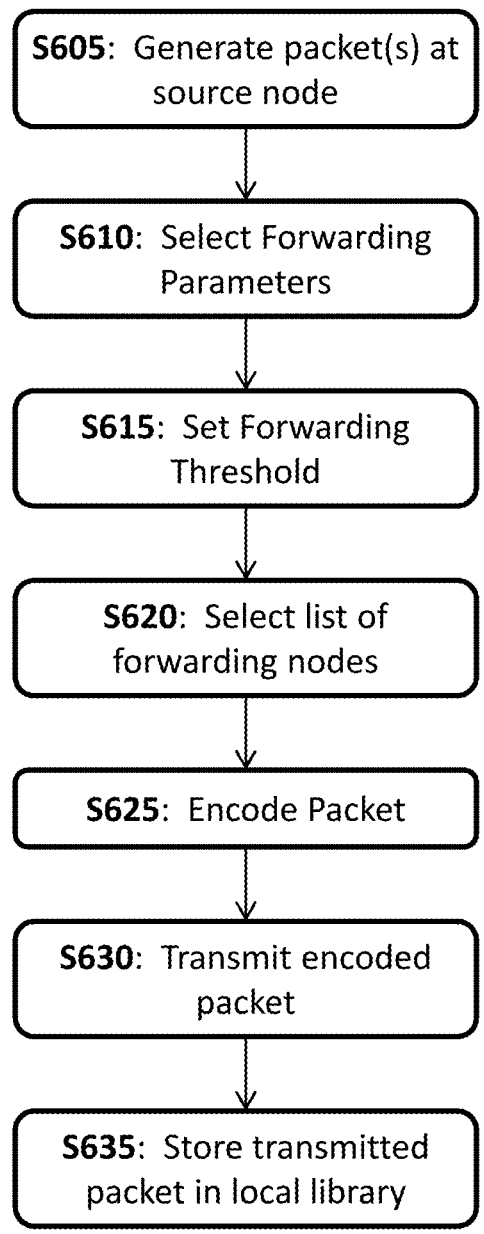
FIG. 6 illustrates a flow diagram describing a method for transmitting packets in a mesh network according to an exemplary embodiment of the present disclosure.

FIG. 6 shows, according to an exemplary embodiment, a method for transmitting packets in a mesh network utilizing a store and forward mechanism. At step S605, a first node or device, may generate and/or create one or more packets. The packets may be generated in accordance with a overlying application utilizing the mesh network. After generating the packets, the first device may select one or more forwarding parameters at step S610. For example, the forwarding parameters may be any parameters, including, for example, the aforementioned relevant candidate parameters which can be used by the first device in order to set a forwarding threshold, at S615. The forwarding threshold may be used for determining or selecting a set of forwarding nodes to which the first device can transmit the generated packets. Based at least on the determined forwarding threshold or any other suitable determinant(s), the first device may select one or more forwarding nodes at step S620. After selection of one or more forwarding nodes, the first device may encode the generated packets at step S625. The first device may then transmit the encoded packets to the one or more forwarding nodes at step S630. The first device may store transmitted packets, for example, in a locally held library and the like, for future reference at step S635.

Figure 7:
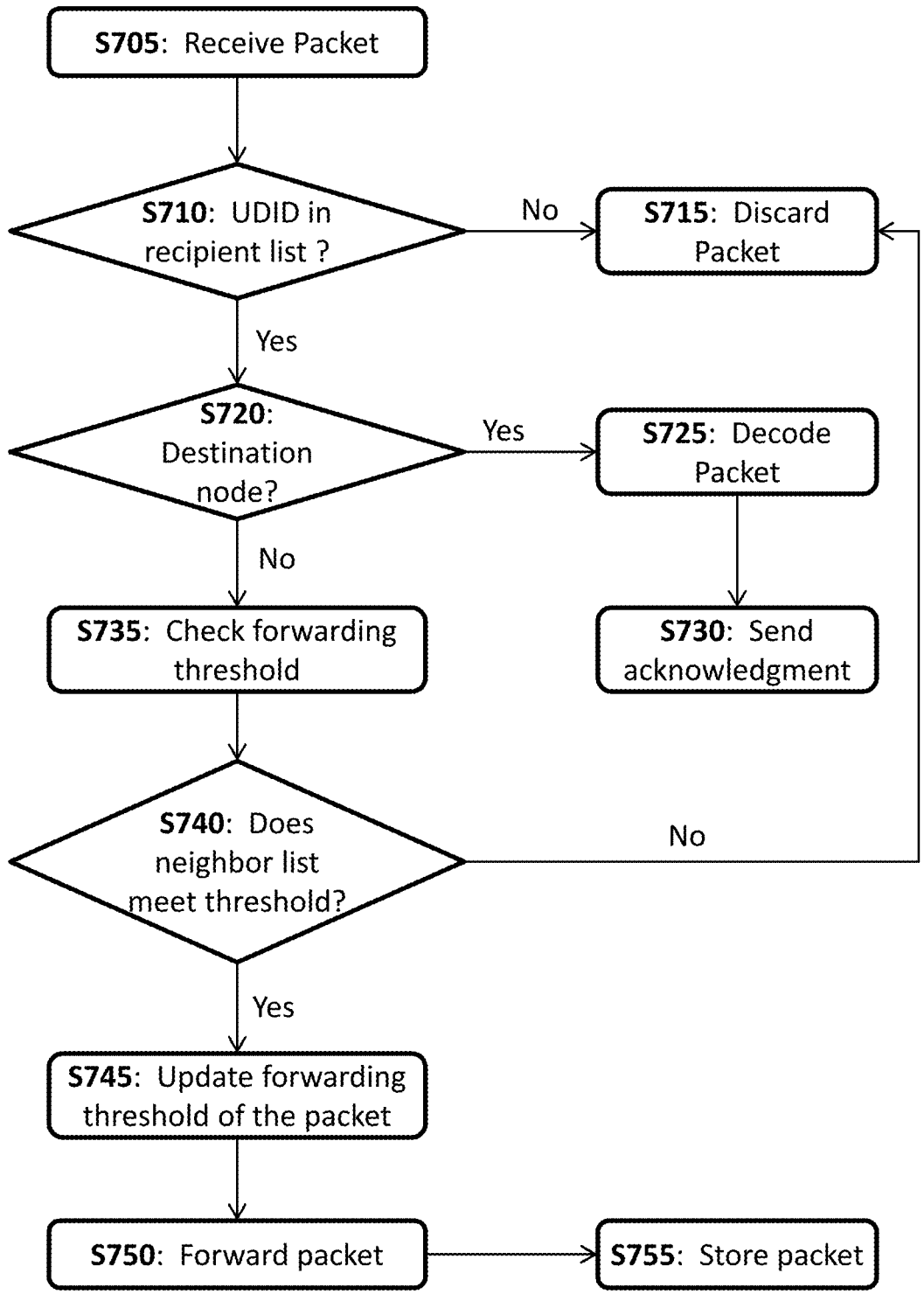
FIG. 7 illustrates a flow diagram describing a method for retransmitting packets in a mesh network according to an exemplary embodiment of the present disclosure.

FIG. 7 shows, according to an exemplary embodiment, a method for retransmitting packets in a mesh network utilizing a store and forward mechanism. For example, at step S705, a receiving device/node, may obtain or receive one or more packets from a transmitting node in an highly dynamic ad hoc wireless network. At step S710, the receiving device may examine the received packets in order to determine whether the receiving device is an intended recipient of the packet. For example, the receiving device may examine one or more identifying variables, such as, for example, preformatted unique device identifiers ("UDIDs") located in the packet. In this regard, the receiving device may determine whether any of the one or more UDIDs located in the received packets matches the receiving device's UDID. If the receiving device determines that it is not an intended recipient for the packet data, then at step S715, the receiving device may discard the received packets.

If in step S710 the receiving device determines that it is an intended recipient for the packet data, then at step S720, the receiving device may determine whether it is the destination for the received packets. For example, the receiving device may evaluate the packet to make such a determination. If the receiving device is determined to be the destination for the one or more received packets, then at step S725, the receiving device can decode the one or more received packets. After decoding the one or more received packets, the receiving device may, at step S730, send an acknowledgment that the receiving device received the one or more packets. For example the receiving device may send an acknowledgment that is intended for the originating device.

If in step S720 the receiving device is determined not to be the destination for the one or more received packets, then at step S735, the receiving device may check the forwarding threshold of the packet. In other words, an application located on the receiving device may process the one or more received packets to evaluate the forwarding threshold. At step S740, the receiving device may determine whether any neighboring devices meet the criteria of the forwarding threshold. If no devices are determined to meet the forwarding threshold, the one or more received packets may be discarded in step S715.

If in step S740 at least one neighboring device is determined to meet the forwarding threshold, then at step S745, the receiving device may update the forwarding threshold of the packet. For example, the receiving device may manipulate, eliminate, remove, and/or delete from the packet data of the one or more received packets, data identifying nodes as recipients, or criteria which are determined not to meet the forwarding threshold. At step S750, after updating the forwarding threshold and the like, the receiving device may forward the one or more packets to each of the neighboring nodes that meets the updated forwarding threshold criteria and is an intended recipient of the one or more received packets. After forwarding the one or more received packets to the appropriate neighboring nodes, the receiving device, at step S755, may store the forwarded packets locally for future reference.

Isolating Network Functionality

In exemplary embodiments, isolating networking functionalities from any overlying applications can provide the capability to implement multiple routing schemes concurrently for optimization to application-specific requirements.

Figure 2:
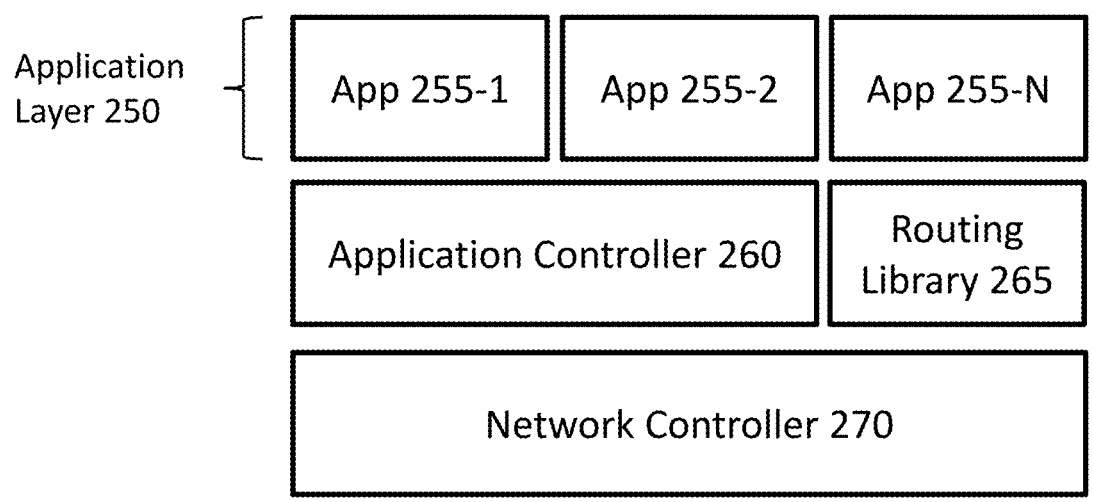
FIG. 2 illustrates the network-level components of a node in a mesh network according to an exemplary embodiment of the present disclosure.

For example, in FIG. 2, network-level components are broken into three distinct planes: application layer 250, application controller 260 and routing libraries 265, and the network controller 270.

In exemplary embodiments, the first component (application layer 250) may contain each individual application 255 utilizing the underlying network. These one or more applications 255 (1 to N) can pass down to the application controller 260 a set of prioritized attributes, specific to that individual application 255.

Based on these handed-down parameters, the application controller 260 may correlate the application 255's set of desired attributes so as to implement the appropriate routing protocol contained inside of a routing protocol library 265. In this regard, the application controller 260 may be primarily responsible for determining various routing algorithms and performing high-level networking functionalities. By allowing different applications to utilize multiple routing protocols concurrently, this interface will enable each application 255 to exist in its own virtual subnetwork. For example, a multiplayer game between nodes in a virtual subnetwork may continue to route traffic concurrently for network control packets, and any additional third party application data.

Examples of routing protocols may include proactive, reactive, hybrid, delay tolerant store and forward mechanisms, neural networks, graph partitioning schemes, Redundant Dynamic Protocol, social profiling mechanisms, to name a few. In some exemplary embodiments, the network may implement single data packet propagation wherein the size of the packets may vary based on the routing protocol being implemented.

In exemplary embodiments, a network controller 270 may be primarily responsible for actively maintaining a fully distributed asynchronous network topology, capable of providing communications in highly dynamic and stochastic environments. Active responsibilities may include tracking the overall state of the network, monitoring bandwidth usage by all overlying 3rd party applications, and/or providing neighbor quality evaluations (based off connection qualities, self-evaluations, and relevant time function) for each node. The network controller 270 may further implement various graph partitioning schemes so as to provide the capability to manage each overlying subnetwork.

In exemplary embodiments, a network map may allow higher layer applications to track what neighbors are available without interacting with lower level routing algorithms. For example, control programs may use the network map to modify the way data packets are forwarded without changes to the routing protocol.

In exemplary embodiments, communication between user devices within a mesh network may be carried out without each user device having information regarding a network map or a predetermined network topology. For example, data packets may be generated by and/or received by a user device and then transmitted to one or more neighboring devices that satisfy criteria, such as a connection strength threshold and/or have not already received the data packet. The data packet may be modified as it passes through each user device to identify which user devices have already received the data packet. For example, a device can append its device identifier to a list of recipient devices in an electronic log included with the data packet to indicate that the designated device has received the data packet. The process may be repeated to transmit the data packet to other devices throughout the mesh network. In embodiments, the data packet may include data which identifies the desired recipient/recipient device (e.g., the desire recipients' UDID or other identifier). Intermediate recipient devices may relay the data packet (e.g., receive the data packet and forward it to another device if not the intended recipient) without necessarily accessing the entire packet. For example, it may be sufficient for the user device to electronically access a header or other log to determine if the user device is the intended recipient, and/or to determine which, if any, neighboring devices have already received the data packet. In embodiments, the data packet may be transmitted to a neighboring device regardless of whether that recipient device already received the packet.

In some exemplary embodiments, the components may interact through a simple interface, which may allow them to be replaced or modified without changes to the components running on other layers. In addition, third party applications may use the interface to interact with the network via the network controller 270, significantly reducing the difficulty of developing applications that use the ad hoc network.

In exemplary embodiments, the network may be implemented as a downloadable platform, enabling ad hoc capabilities without requiring root access to the device or any direct modification of the underlying hardware. For example, an application 255 may be downloaded from an application store, through a web browser, to name a few.

Devices

In exemplary embodiments, various types of devices that may wirelessly connect to the network, and thereby participate as a node, include, for example, mobile phones, smart phones, PDAs, gaming consoles, wall-charging units, DC power node, light bulbs, laptop computers, desktop computers, tablet devices, miscellaneous interactive appliances, navigation devices, drones, and/or interactive billboards. In embodiments, devices participating as nodes in a mesh network may be wearable electronic devices, such as wrist devices, bracelets, eyewear (e.g., glasses or a monocle). In embodiments, one or more mobile devices may participate as nodes in a mesh network. FIG. 1 illustrates user devices 201 participating as nodes in an exemplary mesh network. Any device participating in a mesh network may include one or more of the features of node devices described herein with respect to FIG. 8A. In embodiments, an interactive appliance may be a refrigerator, which may communicate when food will expire, communicate the amount of available space inside the refrigerator, adjust the temperature, to name a few. An interactive appliance may be a smoke detector or other sensor, which may communicate the presence or concentrations of smoke or chemicals, and/or may provide alerts, alarms, and/or contact of emergency or other personnel, to name a few. Lights may also participate as nodes in a mesh network. Such lights may be turned on and/or off or otherwise programmed from another node in the network. Heating and cooling units and/or thermostats may participate as nodes and may communicate temperature data, adjust temperature settings or adjust other climate control settings (e.g., fan settings, temperature controls, to name a few), turn on and/or off, to name a few. Other appliances, such as a washing machine or a dryer, may indicate to other nodes the time remaining in a cycle, may turn on/and or off (e.g., in response to instructions from another node), to name a few. In other embodiments, an oven, stove, microwave, and/or like appliance participating as a node in the mesh network may be turned on and/or off, the temperature settings or cooking modes may be adjusted, the temperature setting may be communicated, time information (e.g., a count-down kitchen timer, count-up kitchen timer, to name a few) may be communicated, to name a few. In embodiments, media centers, stereo systems, gaming consoles, televisions, and/or computers may be accessed, communicated with, and or controlled, e.g. to power on and/or off, to change channels or stations, to play media works on demand, to create playlists, and/or to perform any of the native functions of any of those or like devices.

In embodiments, drones may be autonomous and/or remote controlled devices that may participate as nodes in a mesh network. Drones may travel through air, water, and/or on land, either on their own power (e.g., wheel, track, or leg-operated transportation, boats, aircraft, spacecraft, to name a few) or in conjunction with external transportation (e.g., a drone may be placed in an automobile, on a blimp, in a boat, to name a few). In embodiments, nodes may be mounted on any moving device, including people or animals. In embodiments, drones may increase the geographic coverage and/or available bandwidth of a mesh network.

Figure 15:
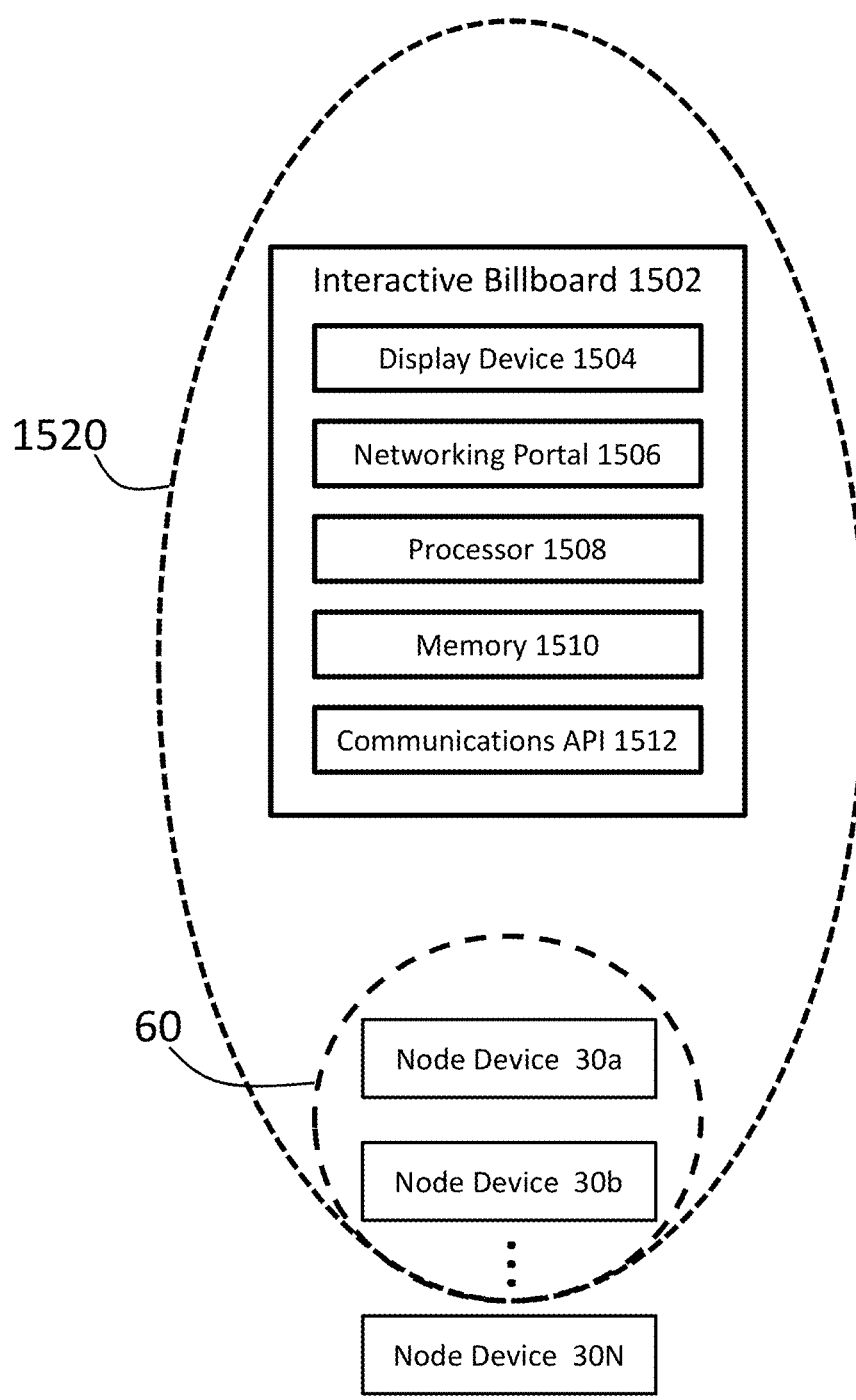
FIG. 15 is a schematic diagram of a mesh network with an interactive billboard as a participating node according to an exemplary embodiment of the present invention.

FIG. 15 is a schematic diagram of a mesh network 1520 with an interactive billboard 1502 participating as a node.

An interactive billboard may include a display device 1504, which may be a scrolling screen or television screen, to name a few. An interactive billboard 1502 may include a networking portal 1506, which may include hardware and/or software to handle and/or process communications with one or more devices in a mesh network and/or with one or more other networks (e.g., the Internet) or non-node devices (e.g., a computer that may be used to program the billboard). An interactive billboard 1502 may include a processor 1508, which may process and/or run one or more operating systems and/or software applications, and/or memory 1510, which may comprise one or more databases. Memory 1510 may store, in one or more databases, user data, node device data, data associated with one or more application programming interfaces ("APIs") (e.g., a communications API 1512), advertisement data, and/or product data, to name a few. A communications API 1512 may comprise software for communicating with one or more nodes in a mesh network. In embodiments, a communications API 1512 may receive and/or deliver user data, advertisements, product data, store data, restaurant data, data regarding services, media and/or multimedia works, to name a few. An interactive billboard 1502 may connect to one or more nodes 30 in a mesh network 1520 at a location 60. In embodiments, nodes 30 may connect to the mesh network 1520 as they enter a location 60, and nodes 30 may disconnect from the mesh network 1520 as they leave the location 60. A location 60 may be a store, shopping mall, certain distance from an interactive billboard 1520, and/or other area to which the mesh network 1520 extends.

Figure 8A:
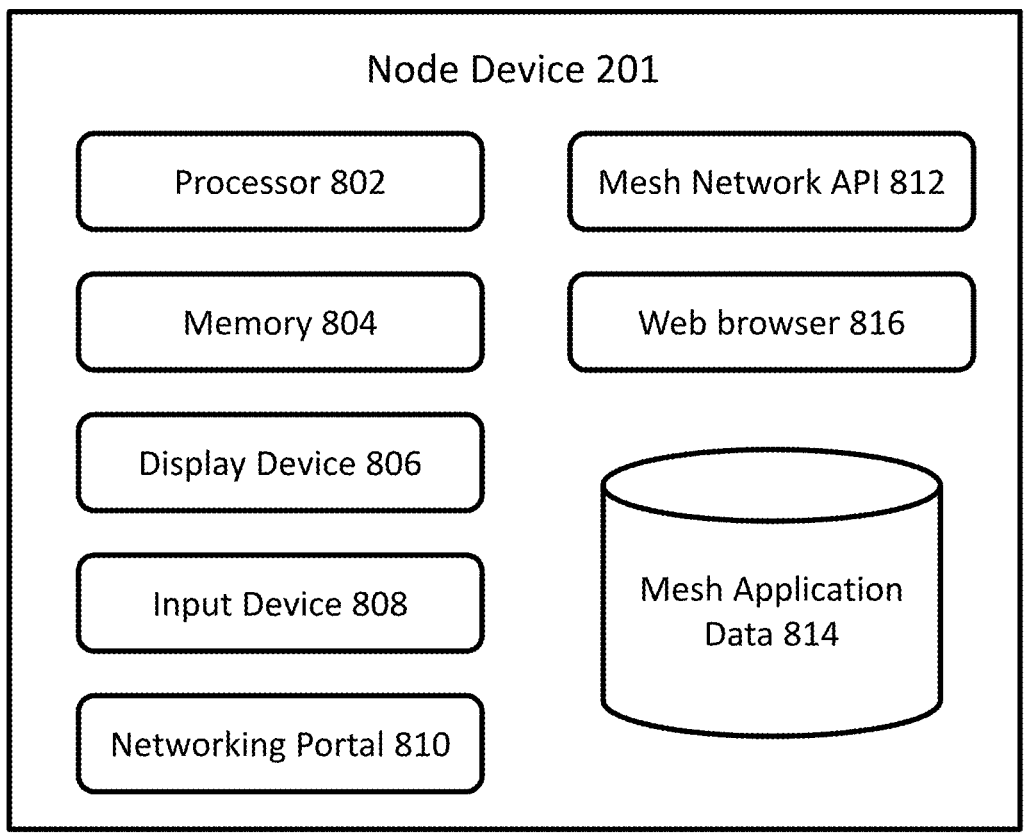
FIG. 8A is a schematic diagram of an exemplary node device according to an exemplary embodiment of the present invention.

FIG. 8A is a schematic diagram of an exemplary node device in accordance with the present invention. FIG. 8A illustrates node device 201, although it may be representative of any node device that may participate in a mesh network. A node device may have one or more processors 802, which may run one or more operating systems and/or software, such as one or more mesh network APIs 812 as well as any native applications of the device. Memory 804 is non-transitory computer-readable media and may also be computer-writable media. Memory 804 may store, in one or more databases, user settings, files, media works, and/or mesh application data 814, to name a few. Mesh application data 814 itself may be stored in one or more databases.

Mesh application data 814 may include user preferences, profile data, media works (e.g., pictures, videos, audio works, to name a few), advertisements, user data (e.g., name, age, gender, contact information, billing data, to name a few), location data, guided tour data, data about points of interest in a geographic area, video game data, neighbor data (e.g., data describing and/or identifying neighboring nodes or user devices, such as device address, connection strength, battery life, connectivity to other networks, to name a few), communications data (e.g., messages, such as transmitted messages and/or received messages), streaming data (e.g., streaming audio or video works, which may be streamed in real time or may be delayed, sports commenting, instant replays, to name a few), product data and/or sale data (e.g., data indicating the items, sales, promotions, inventory status, ordering info, and/or product location info within a retail store, mobile food cart, to name a few), restaurant data (e.g., menu data, menu specials, price specials, restaurant or cuisine information, nutrition information, chef information), entertainment performance data (e.g., artist info, concert venue details, sports player statistics or performance history information), and/or survey data (e.g., surveys or questionnaires), to name a few. Mesh application data 814 may be generated at a node device 201, received by a node device 201 through non-mesh network communication, and/or received by a node device 201 through one or more mesh networks. Mesh application data 814 may be transmitted (e.g., either through a mesh network or non-mesh network communication), stored, and/or used in conjunction with one or more software applications, to name a few.

Still referring to FIG. 8A, a node device may also include a display device 806 and/or an input device 808, which may be a keyboard, mouse, touchscreen, microphone, and/or camera, to name a few. In embodiments, a microphone may be used to record audio inputs. In embodiments, software may operate on one or more audio inputs to convert the audio to text. A node device may include a networking portal 810, which may comprise software and/or hardware, such as a wireless antenna, sockets for data cables or other cables, and/or circuitry for communications. A networking portal 810 may provide communications via Wi-Fi, Bluetooth, cellular data, infrared, radio, microwave, other electromagnetic waves, LAN, WAN, and/or other wired or wireless protocols. In embodiments, a node device may connect to an external networking device for communications. A web browser 816 may provide access to the World Wide Web or any domain name system ("DNS"), e.g., a DNS provided by one or more nodes in a mesh network.

Figure 8B:
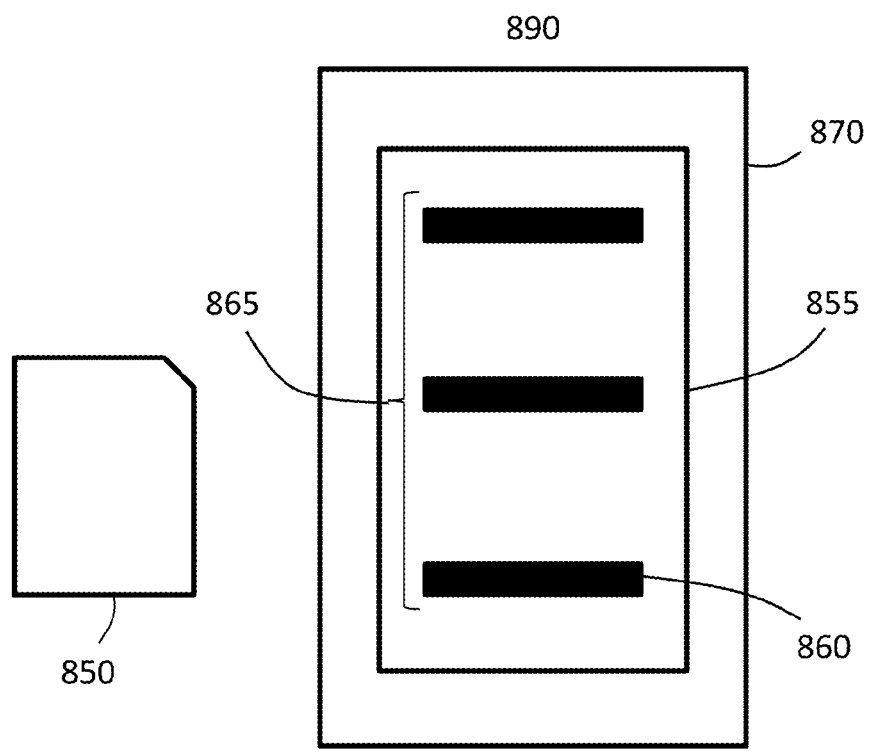
FIGS. 8B and 8C illustrate exemplary nodes according to exemplary embodiments of the present disclosure.
Figure 8C:
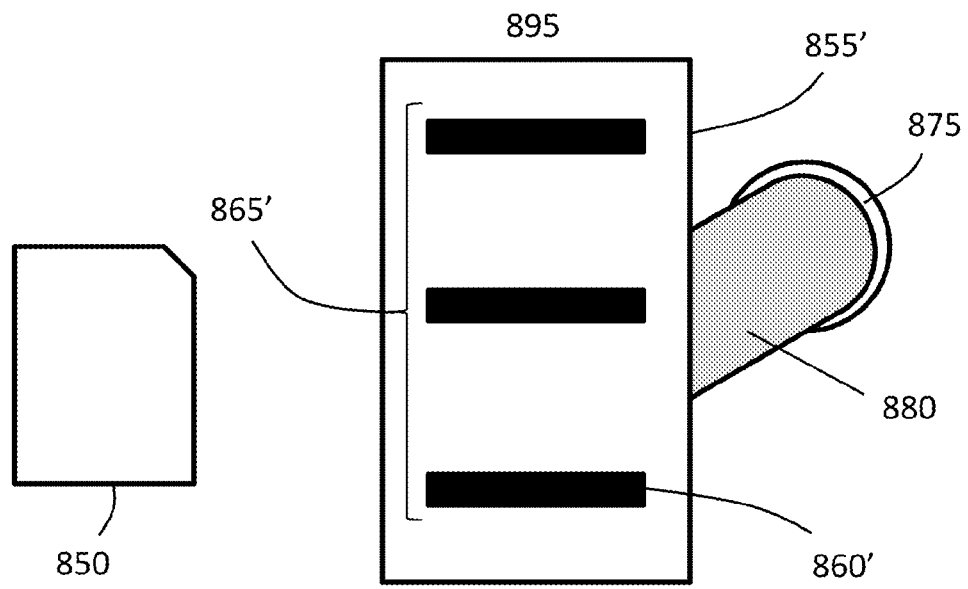

In exemplary embodiments, one or more nodes of the network may self-autonomously relay node devices, which may provide a method of creating and/or expanding a mesh network, as described herein. In embodiments, an application programming interface may be stored on removable memory, such as an SD card, Micro SD card, USB drive, flash memory device, and/or solid state memory device, to name a few. A reader of the removable memory may include a processor, memory (e.g., RAM, ROM, and/or EEPROM), and/or additional wireless antennas, to name a few. The API may be distributed from a first device (e.g., a wall-charging unit, a smart phone, to name a few) to a second device (e.g., a second wall-charging unit, a printer, a desktop computer, a laptop computer, a smart phone, to name a few). In exemplary embodiments, nodes may be implemented by one or more card readers and with one or more wireless cards, for example a wireless SD card. Exemplary nodes are shown in FIGS. 8B and 8C. A card reader may include circuitry 855 to execute stored computer instructions on the card. The card 850 (and 850'), typically a wireless SD card, may be used to connect with other nodes of the mesh network. In embodiments, the card 850 (and 850') may be a wireless memory card. A wireless card may comprise an antenna, memory, I/O, and/or a modem, to name a few.

In embodiments, a wireless SD card reader may be custom designed to be powered by any power source, such as a wall socket, car DC socket, external battery, to name a few. FIG. 8B shows a wall unit 890 comprising wireless SD card reader circuitry 855 custom designed to be fit and powered by a power source that is a wall socket 870. FIG. 8C shows a DC unit 895 comprising wireless SD card reader circuitry 855' custom built to be fit and powered by a power source that is a DC socket 875, as found in an automobile. A DC power plug 880 may interface between the DC socket 875 and card reader circuitry 855' to deliver power to the circuitry 855'. In the embodiments of FIGS. 8B and 8C, a wireless SD card may simply be inserted into one or more card slots 860 (and 860'). A plurality of card slots 860 (and 860') may comprise a card bank 865 (and 865'). The card reader may then start reading and implementing the instructions on the card 850 (and 850'). The card reader may power the wireless card, e.g., so that the card may transmit and/or receive data. In some embodiments, an SD or micro SD card may be inserted into pre-existing hardware including, for example, laptops, digital cameras, gaming consoles, mobile phones, tablet devices, navigation devices, interactive appliances, point-of-sale systems, to name a few. Such pre-existing hardware may read a wireless memory card, process the data or any applications contained thereon, and/or power the wireless card.

Figure 9:
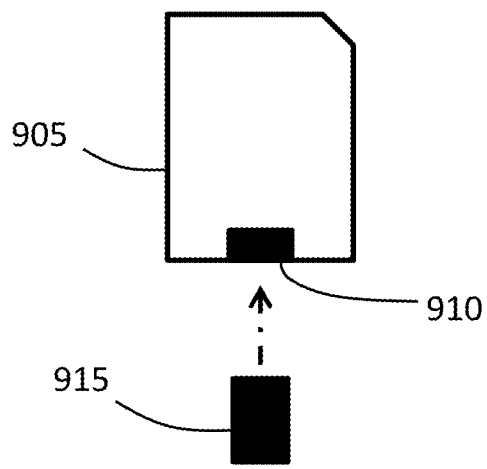
FIG. 9 illustrates exemplary components of a node according to an exemplary embodiment of the present disclosure.

FIG. 9 shows a custom wireless SD card 905 that can have an additional slot 910 for a wireless micro SD card 915. When the wireless micro SD card 915 is inserted into the slot 910 of the standard (first) wireless SD card 905, the resulting card combination may support two functioning communications portals, one from the micro SD card 915 and one from the standard SD card 905. In embodiments, each card may have a wireless radio. The card reader can read and execute instructions from both cards, and thereby access to receive/send data from the radios of each card, the SD card and the micro SD card.

The nodes with the wall-unit 890 and other mobile devices can be used in an office environment to provide easy connectivity throughout the office between various devices, such as desktops, laptops, computer monitors, printers, etc., in addition to the relay nodes, mobile devices, etc. In embodiments, nodes with the DC unit 895 may provide communications among one or more automobiles or other devices in a mesh network including at least one automobile with a DC unit 895. In embodiments the wall-unit 890 and/or DC unit 895 may provide greater power and/or greater range for an associated mesh network.

Social Media Platform

In exemplary embodiments, a social media platform may utilize a dynamic wireless ad-hoc network (e.g., a mesh network) in accordance with the present disclosure. In this regard, a social media mobile application may execute on one or more nodes of the network in order to implement features of the social media platform. The social media platform may also be geolocation based, and may utilize the location based services of the mesh network. In exemplary embodiments, the social media mobile application running on a node/device, e.g., a mobile device, laptop, etc., may interact with other nodes or devices using the network. Therefore, unlike traditional stagnant networks, the social media platform may interact with nodes that may enter the mesh network in a highly dynamic fashion.

For example, the underlying mesh network may constantly maintain the highly dynamic behavior of the network topology by seamlessly establishing full-mesh wireless connectivity between each device in the mesh network. As devices enter and leave the network, constant maintenance of the network's highly dynamic topology may enable each other device to continue substantially uninterrupted communications during network partitioning and concatenations.

Figure 3A:
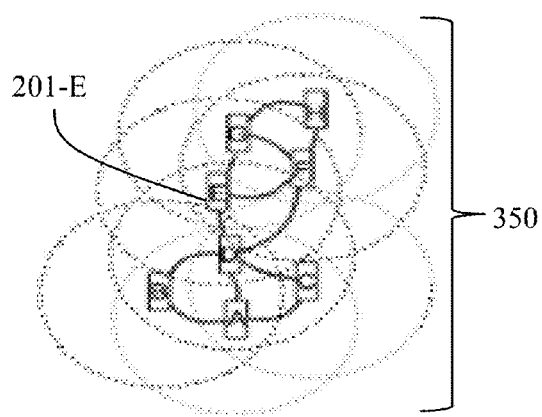
FIGS. 3A-D illustrate changes to highly dynamic wireless ad hoc networks according to an exemplary embodiment of the present disclosure.
Figure 3B:
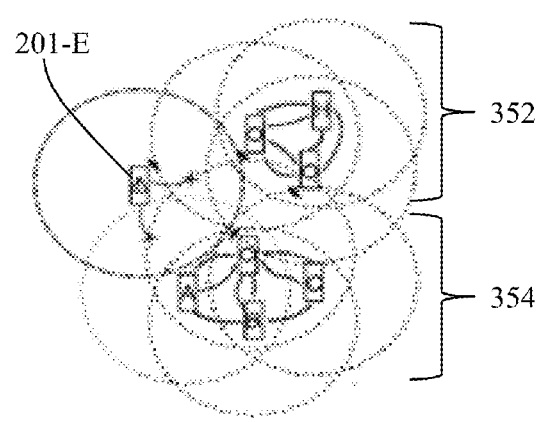
Figure 3C:
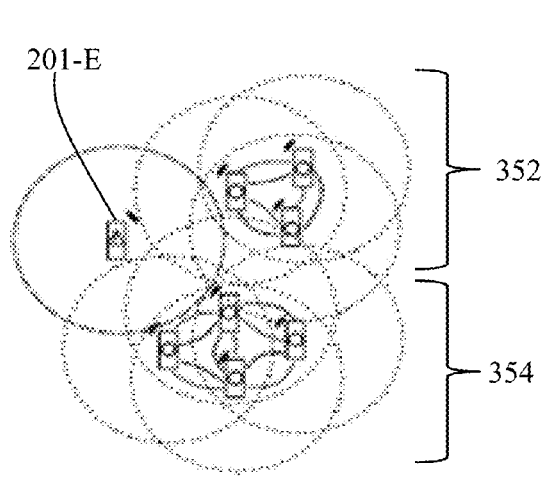
Figure 3D:
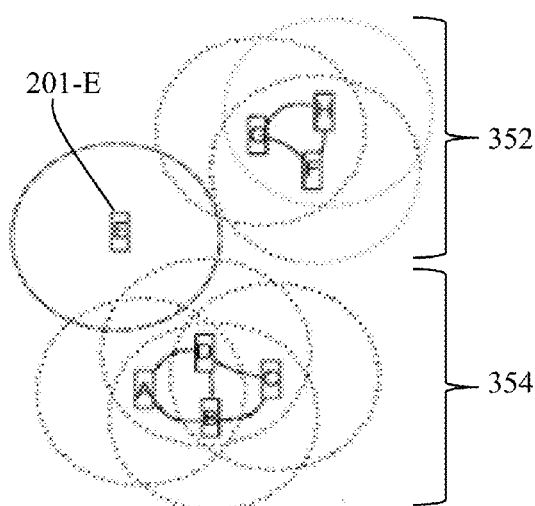

FIGS. 3A-D and 4A-D show, according to exemplary embodiments, examples of the progression of network connections for an exemplary highly dynamic network. FIGS. 3A-D provide a visual representation of a series of wirelessly connected network devices. In FIG. 3A, at a time T305, a single cluster of devices 201 (including device 201-E) forming a dynamic network 350 is presented. In FIG. 3B at a later time T310, one of the devices 201-E starts to leave or move away from the established mesh network 350. As a result, two dynamic mesh networks, 352 and 354, start to develop at T310. In FIG. 3C, at a time T315, device 201-E moves further from the mesh network or networks, furthering the development of two mesh networks 352 and 354. Finally, in FIG. 3D, at a time T320, as the device 201-E leaves, two separate dynamic networks 352 and 354 are fully and seamlessly formed, in accordance with exemplary embodiments.

Figure 4A:
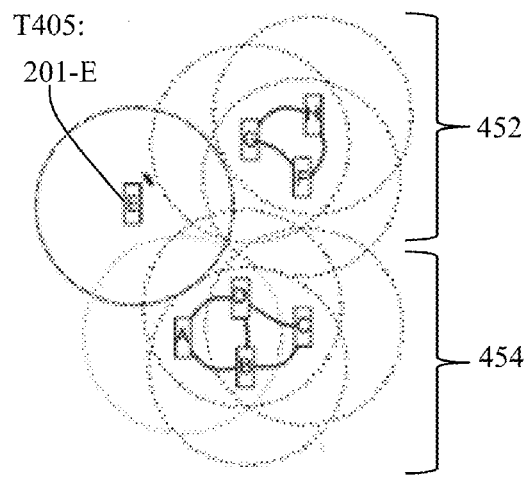
FIGS. 4A-D illustrate changes to highly dynamic wireless ad hoc networks according to an exemplary embodiment of the present disclosure.
Figure 4B:
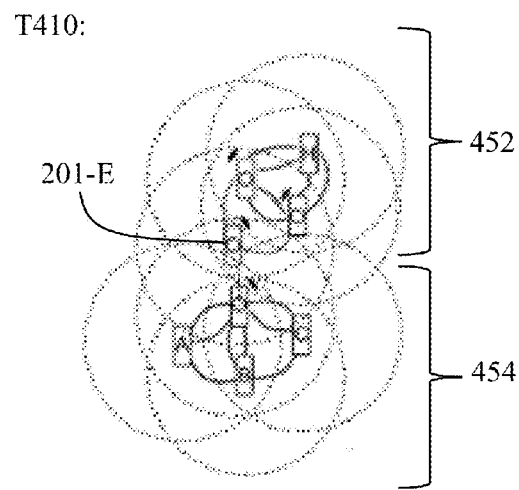
Figure 4C:
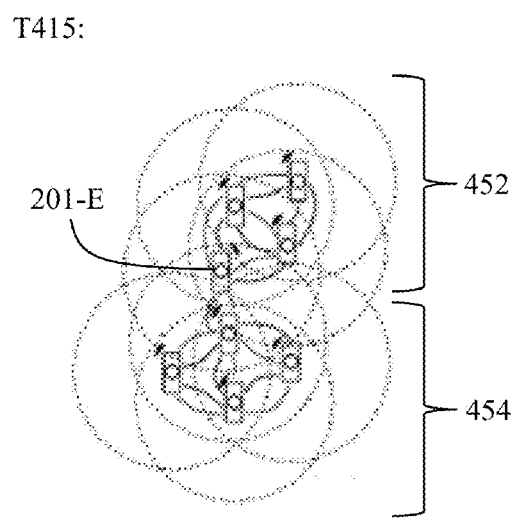
Figure 4D:
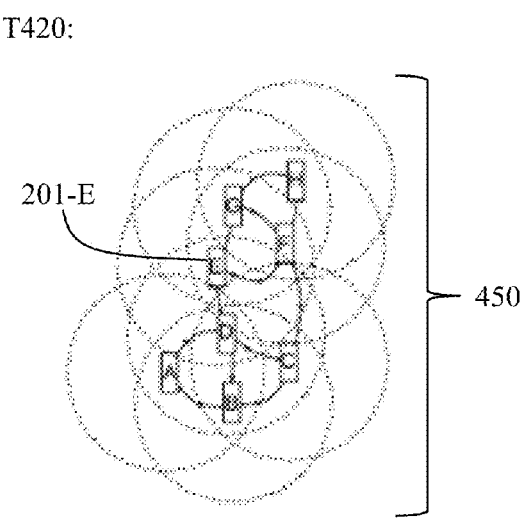

FIGS. 4A-D, illustrate an example of a highly dynamic network that may form from previous separate highly dynamic networks 452 and 454. In this regard, in FIG. 4A, at a time interval T405, a single device 201-E starts to enter or approach the two separate networks 452 and 454. As a result, FIGS. 4B, 4C, and 4D, show at times T410-T420, the progression as the single device 201-E enters the networks 452 and 454 so as to form a bridge between the two networks 452 and 454 and form a single dynamic network 450. Of course, other variations of forming and/or dividing highly dynamic networks may exist. For example, a plurality of devices may enter and/or leave one or more established highly dynamic networks, which may result in the merging and/or subdividing of the established highly dynamic networks in accordance with exemplary embodiments. Similarly, the same network may grow or shrink as individual devices are added or removed as a result of user migration into and/or out of the range of the mesh network.

In embodiments, the application may create a local social network for a particular environment, e.g., sports venues, stadiums, concert venues, merchant/stores, museums, night clubs, restaurants, bars, resorts, hotels, city centers, municipalities, municipal buildings, airports, transportation hubs, transit systems, buses, airplanes, trains, subways, designated areas, schools, universities, parks, corporate parks, public squares, amusement parks, etc. The application may provide information being transmitted as one or more data packets to one or more nodes in the mesh network. Such information can include advertisements, news updates, weather reports, traffic reports, emergency alerts, other conditions reports (e.g., ski lift reports, trail reports), menus, statistics (e.g., sporting event scores, player statistics, trivia statistics) and/or schedule information (e.g., a concert and/or event line-up, train schedule, hours of operation), to name a few. The application may provide multimedia works (e.g., sports replays, promotional videos, songs, to name a few) to nodes through the mesh network. In embodiments, the information could include data packets associated with an interactive video game being played between users of devices within the mesh network and/or with users outside the mesh network, connected to the mesh network via an external node. The application may provide two-way communication among nodes and/or between nodes and devices on external networks. The application may collect and provide information from user devices (nodes), which the venues and/or merchants may use in order to provide targeted information, advertisements, promotions, conduct electronic transactions, place orders, etc. to the users or user devices. For example, using the device, a venue may send an advertisement to selected users to purchase a food item, which the user may in turn accept, and charge to an electronic account. Using geolocation information, the vendor can identify the location of the user and deliver the item to the user, with it being fully paid for in advance. Other variations of such scenarios are consistent with the disclosure.

The present invention may be used to provide data and/or communications in areas where cellular or other communications infrastructure is unavailable and/or at least partially unreliable. In an exemplary embodiment of the present invention, an application for ski resorts may be provided. The application may enable communication to or among nodes of a mesh network. Fixed or moving nodes may be placed throughout a ski resort (e.g., mounted on ski patrol snow mobiles, on ski lift gondolas, and/or on towers, to name a few). In embodiments, such nodes may not be necessary to sustain a mesh network, e.g., where there are sufficient user devices owned and/or operated by resort patrons to form a mesh network of a certain coverage area or transmission speed. A ski resort mesh network may integrate with a software application, which may provide reports and/or updates (e.g., push notifications) for weather, trail conditions, lift conditions, and/or resort hours, to name a few. An application may further enable communication with other devices, e.g., to allow friends or families to communicate while at the resort. A ski resort application may provide emergency communication (e.g., notifying the ski patrol of an emergency) and/or emergency location information (e.g., geolocation of an injured person's user device). A ski resort application may provide advertisements, ticket purchasing, and/or menu ordering (e.g., pre-ordering food from a ski lodge restaurant), to name a few. Other embodiments of the present invention having similar features are possible, such as applications for remote but highly trafficked parks (e.g., certain national parks).

Figure 5A:
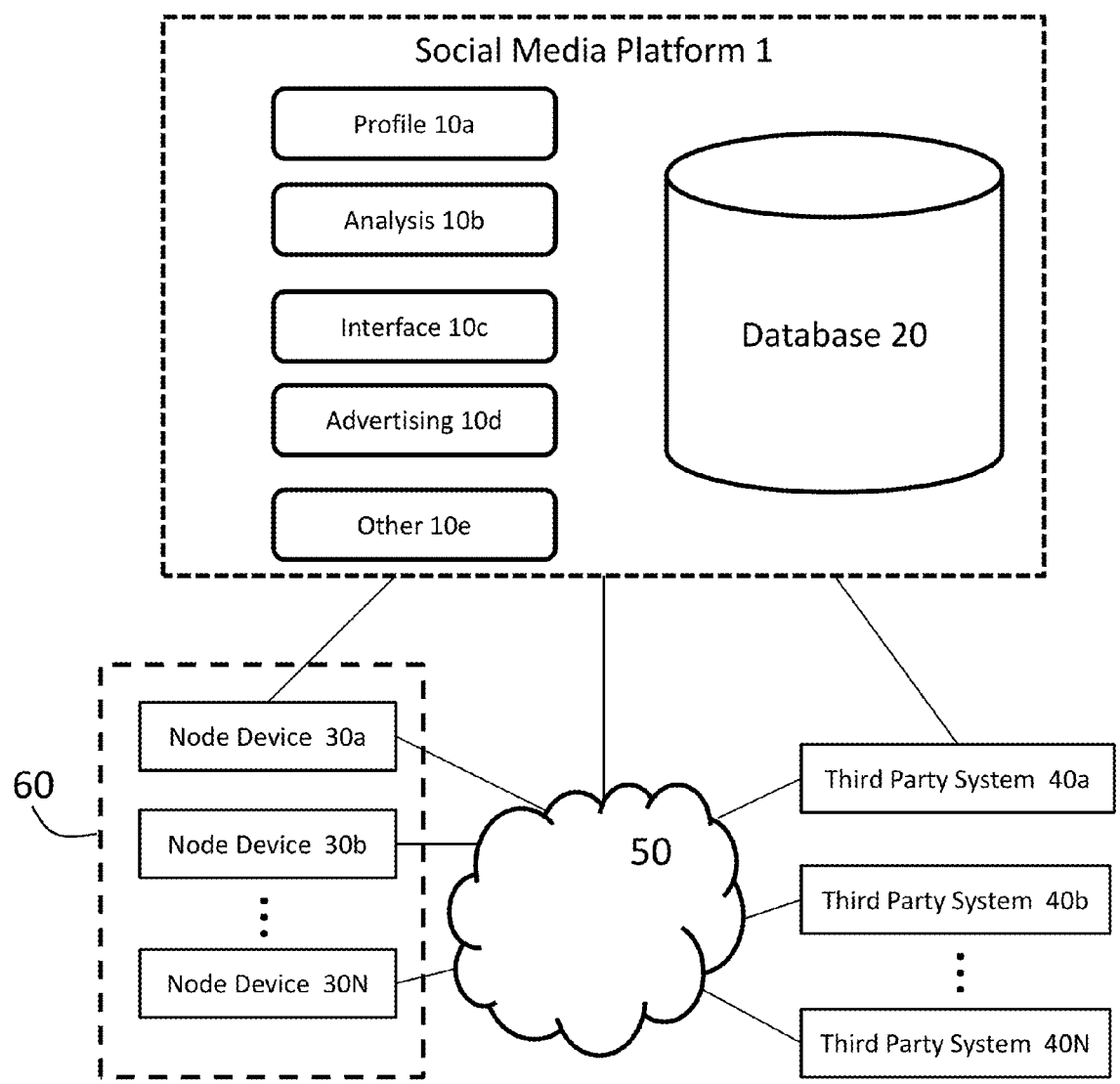
FIGS. 5A and 5B are schematic diagrams of a social media platform according to exemplary embodiments of the present disclosure.

FIG. 5A shows, according to an exemplary embodiment, a system diagram with devices for implementing a social media platform 1. The node devices 30a, 30b, . . . 30N (individually or collectively designated 30) may each be in wireless communication with each other using the wireless ad hoc network, as described herein. In embodiments, the nodes 30 may be locally situated and/or confined to a particular location 60, though this is not necessary. In embodiments of the present invention, a mesh network will exist at location 60. One or more of the nodes 30 may be able to communicate to one or more networks, designated for convenience as network 50. The network 50 may be any WAN, LAN, Internet, and/or suitable third party network, and can provide a gateway connection for the one or more nodes 30. In embodiments, the network may be a mesh network connected through wireless communications like Wi-Fi, Bluetooth, cellular, etc.

Figure 5B:
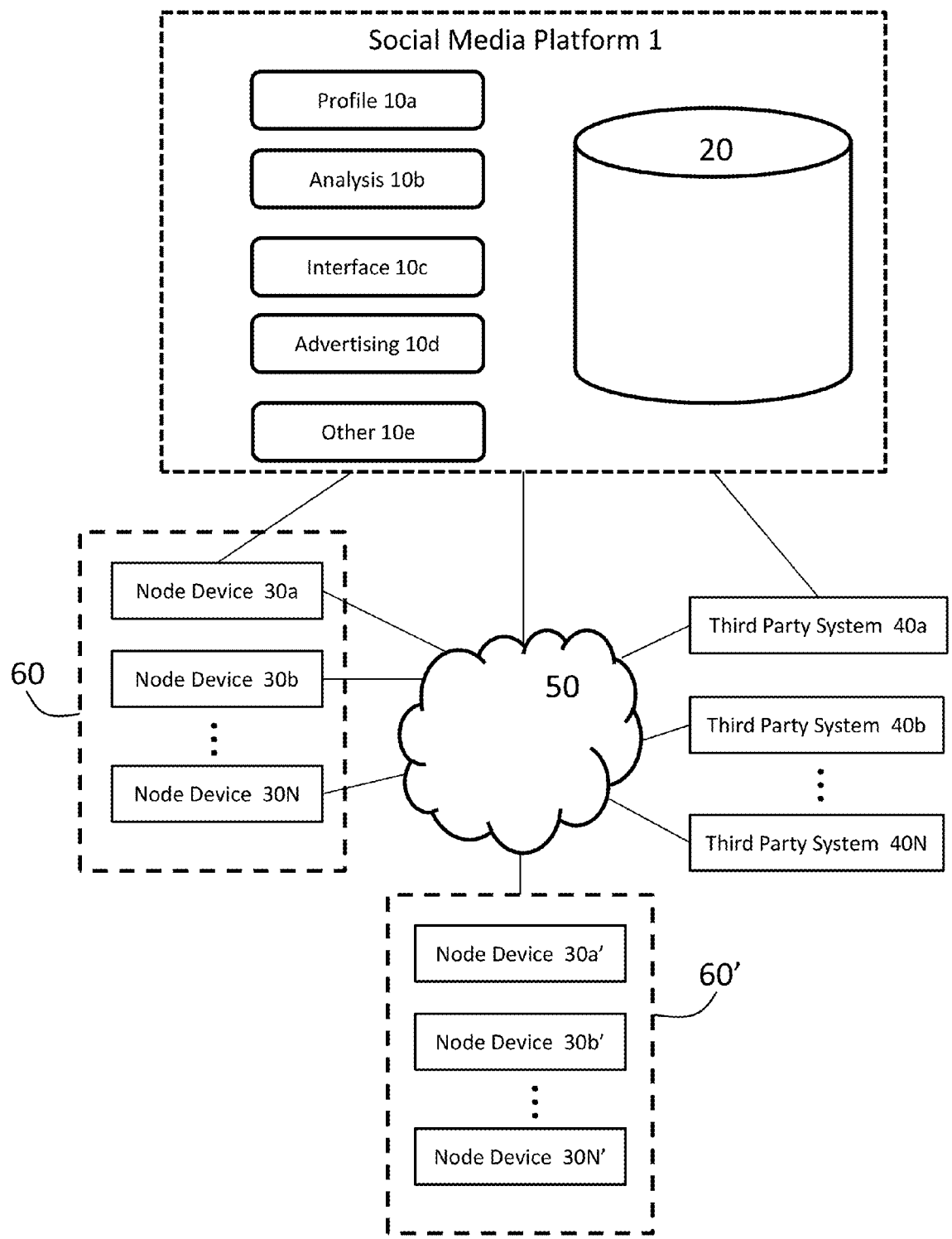

Referring to FIG. 5B, a mesh network at a particular location 60 may communicate directly or indirectly with one or more other mesh networks, such as the mesh network at location 60'. In embodiments, the connection to one or more other mesh networks may be indirect, e.g., through network 50. For example, one or more devices in a mesh network at location 60 may be connected to a third party network 50, which in turn may be connected to one or more devices in a mesh network at location 60', thereby allowing each of the devices 30 in mesh network at location 60 to communicate with each of the devices 30' in mesh network at location 60'. In addition to the participants in the one or more networks described with respect to FIG. 5A, in FIG. 5B the network at location 60' may comprise nodes that may themselves comprise node devices 30a' . . . 30N'.

Referring to the embodiments illustrated in both FIGS. 5A and 5B, the nodes 30 may operatively connect, either directly or indirectly with social media platform 1. The social media platform 1 may include one or more components (e.g., any combination of hardware and/or software, such as processors, memory, display devices, input devices, networking portals (e.g., antennae and/or accompanying software), software applications, to name a few) which implement one or more aspects of the social media network. In this regard, the social media network 1 may include one or more databases 20, which may be located locally and/or remotely to the other components of the social media platform 1. Database 20 may include electronic information, such as data related to advertisements, user data, or any of the data associated with one or more mesh applications or APIs 812, such as mesh application data 814, discussed herein with respect to FIG. 8A.

Still referring to FIGS. 5A and 5B, the social media platform 1 may include one or more components (e.g., any suitable combination of software and/or hardware) including, for example, a profile component 10a, analysis component 10b, an interface component 10c, an advertising component 10d, and/or other component 10e. These components may interact with one another and/or interact with one or more databases 20. In embodiments, the various components may be locally or remotely located with respect to each other.

In exemplary embodiments, the profile component 10a may implement one or more processes with regard to creating, maintaining, accessing, and/or retrieving profile information for members of the platform.

In exemplary embodiments, the analysis component 10b may implement one or more processes with regard to analyzing data (e.g., heat maps, reports, etc.) with respect to one or more users of the platform.

In exemplary embodiments, the interface component 10c may implement one or more processes for interacting with nodes, devices, and/or third party systems.

In exemplary embodiments, the advertising component 10d may implement one or more processes with regard to retrieving, generating, and/or providing advertisements, promotions, specials, etc. to members of the platform 1. One or more electronic transactions may be conducted in tandem or separate from the advertising component 10d.

In exemplary embodiments, the other component 10e may implement other processes used to implement other aspects of the platform. Consistent with the disclosure, one or more of these processes may be included in the platform, as desirable.

In exemplary embodiments, a user may create a profile for the social media platform via the social application. In embodiments, the social application may generate a profile using other social media networks and/or applications (e.g., Facebook, Foursquare, Twitter, Apple, Amazon, Google+, Tumblr, etc.). The social application may also access some or all of the information from one or more other social media networks using, for example, APIs associated with such other social media networks. In this regard the Application Controller (which has been previously described herein), may be responsible for interacting with the other social media applications and/or networks (e.g., querying, accessing, and/or retrieving information in order to generate a profile for the user). In this regard, the social application may create a profile which may include, among other thing, the device user's name, picture, real name, and the like. Alternatively, an existing profile may be modified in order to create a profile for the platform 1. The profile may also include members being tracked, social network members tracking the user, security/privacy settings, electronic message inbox, reward points, saved places, etc. This information may be saved locally and/or may be remotely stored at the platform 1. Once a user profile is generated, the Application may use the social media network user profile and/or access other social media network profiles as desired.

In embodiments, the social application may run or execute in the background of a node, e.g., a user may not be required to open the application in order for one or more processes associated with the social application to execute.

In exemplary embodiments, the social application may implement one or more processes for determining the amount many nodes or devices are in a given area or vicinity (designated areas, stores, venues, etc.). This determination may be based on the amount of other devices/nodes the social application can connect to that also have and/or are implementing the social application. In this regard, the social application may cause the host device to periodically query the other nodes in order to exchange information. The locally determined node count, along with node's determined location information (e.g., where is the node device is) may be shared with other connecting nodes. In embodiments, each nodes may create and/or store a record of the node count, and other nodes location information over time. This information may then be shared and/or transmitted to other systems, including the social media platform 1 and/or third party systems 40. In some embodiments, the records may expire and be deleted after a certain period and/or after the information has been shared or transmitted to one or more other systems.

In some exemplary embodiments, a node counting process may be accomplished by identifying other nodes, for example through a monitoring interface implemented on a wireless networking card. The monitoring interface may monitor and/or poll the wireless channels and monitor the received packets to identify all the distinct devices.

In embodiments, after identification the devices, UDIDs (or other identifying information) corresponding to the devices may be stored in order to determine how many distinct devices there are within a given location over a particular period of time. The identified/determined number of devices may be stored as part of the node count data. The packets associated with each UDID may be analyzed to determine what type of application the device is currently running. Based on this determination, the devices which are running the social application can be identified as a node in the mesh network and thus determine the amount of nodes. Therefore, the node count may include the number of devices in a given area, and/or include the number of nodes in a given area. For each node identified, the user/user profile information may also be identified and/or stored.

In exemplary embodiments, the node count information/records may be utilized in various manners, either on a particular node, the platform, a third party system, or combinations thereof. In one exemplary embodiment, the node count data may be used to generate heat maps (e.g., a color coded map of the density of nodes within a given range).

In exemplary embodiments, heat maps may be generated with respect to one or more locations at one or more time periods. The heat map may use any appropriate color scheme (e.g., dark coded areas indicating greater density/activity, light areas indicating low density/activity). For example, a heat map corresponding a particular location (e.g., venue, store, designated area, etc.) may be generated to show how crowded/dense or active the particular location is. For a large particular area, e.g., a park, certain subareas of the heat map may be dark in order reflect the corresponding area of the location which has a high density/area. Data collected from such heat maps by venues can be used to monitor traffic during different periods of time, as well as other statistical analyses.

In embodiments, geographical density with respect to a particular location may be determined using GPS or other geo location information, such as, by estimating the number of hops through neighboring devices, determined/estimated amount of application activity, or combinations thereof.

In embodiments, the heat map may be interactive. For example, a particular heat map may include a slider which, which when activated and moved, causes the heat map to be updated from a first time to one or more other times. For example the slider may cause how a location's density changes by updating a heat map over a plurality of time periods, e.g., over minutes, hours, day(s), week(s), month(s), year(s), etc. A range indicator may also vary the size of the location being illustrated by the heat map. As previous discussed, heat maps may be generated using the node count data. Therefore, the heat map may utilize from the node count data, the amount of active devices and/or may use the amount of active nodes (e.g., devices running the social application).

In embodiments, other variations of the heat maps may be generated and filtered according to various criteria. For a particular location, nodes (devices running the social application), the profile information may be used in conjunction. For example a filtered heat map may be generated to show density by demographic/profile information (age, gender, device type, interests, etc.) Such information may be obtained from the user's profile information associated with each node.

As previous explained, heat maps may be generated on a device (node), the platform 1, and/or a third party system 40. In some embodiments, the platform 1 may provide the heat maps to users of the platform (e.g., through the social application, through a website, email, SMS, messaging, etc.). The platform 1 may provide the heat maps and/or the corresponding data related to a particular location to merchants, venues owners/representatives, or other individuals desiring such information. The data may include user habits, such as for example, how often a user visits particular locations, venues, stores, etc. The data may be used by merchants, venues, etc. in order to send to users or user devices via the social application targeted promotions, advertisements, special events, etc. For example, when a new patron enters a venue, the proprietor may be notified that the individual is a new patron. Similarly, when a previous patron enters a venue, the venue proprietor may be alerted to the presence of the patron, and profile information related to the patron may be provided to the venue proprietor system. Such information may then be coordinated with the venue proprietor's database, so that an appropriate profile of prior purchases, desires, etc. can be generated and provided to the proprietor.

In exemplary embodiments, the social application may be used to search for other users (depending on their privacy settings) at a particular location. The social user may be able to display from another node, any one of another user's picture, contact information, distance away, social media relationship (e.g., Friends on Facebook, Twitter follower, etc.). Further, while at a particular location, the social application may indicate the level of crowdedness (e.g., density). The social application may allow a user to save, bookmark, and/or favorite a particular location for future reference. The social application may allow the user to telecast to the user's social network the fact that the user is at the location and/or conducting certain activity related to the venue (e.g., John is watching the Giant's play football at the Meadowland's stadium). Further, through the social application, a user may be able to directly communicate with other nodes.

As previous explained, the social application may also access information from third party systems and/or other social networks. In this regard, while at a particular location, the social application may also provide relevant location based information. In one example, while at a restaurant, user ratings from Yelp!, Foursquare, Zagat's, Urban Spoon, Google Reviews, Localmind, etc. may be retrieved and presented to the user.

In exemplary embodiments, a targeted promotion may be sent to a node which is in a defined location. For example the node's location may be received or determined by the platform. The platform may use the received location of the node in order to send the targeted promotion to the user device/node. The location may be determined via GPS or any other method in accordance with exemplary embodiments described herein. In another case, the node may receive a targeted promotion directly from another device. For example, when a node (host node) enters a venue, a node operated or owned by the venue (venue node) may detect the node's presence and retrieve and propagate a targeted promotion to the host node using the social application in accordance with the mesh network communication methods described herein. The venue's social application may be substantially similar to the social application running on the host node, but may include additional functionalities for being able to communicate promotions to other devices.

Messaging and Broadcasting

In embodiments, an application may allow users, using one or more user devices, to communicate with one or more other user devices participating in one or more mesh networks. For example, a communications application may allow text messages and/or media messages (e.g., video, pictures, audio works, and/or combinations thereof, to name a few), and/or combinations thereof. In embodiments, other data, such as documents and/or other files, may be communicated through a mesh network. In embodiments, groups or packages of data may be communicated through a mesh network. Groups or packages of data may comprise multiple documents, multiple media works, and/or folders containing multiple files and/or media works, to name a few. In embodiments, an application may provide text-to-voice and/or voice-to-text capabilities, which may be used for messaging among user devices as described herein. In embodiments, such communications may be performed in the context of a stand-alone communications application or in the context of one or more social media applications, as discussed herein. Communication may comprise one or two-way communication, through sending and/or receiving data packets.

Figure 12C:
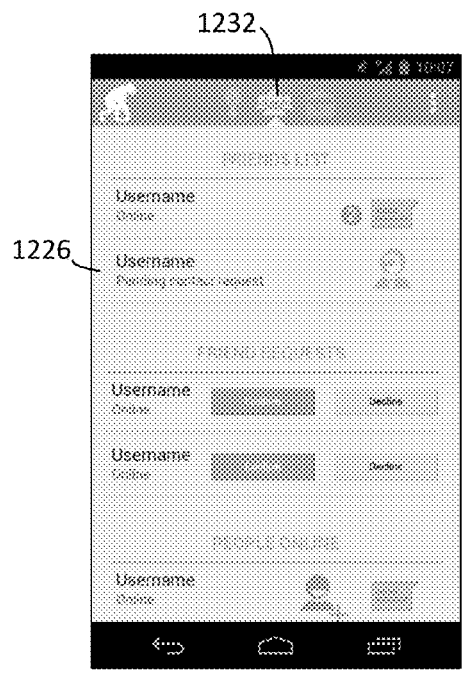

FIGS. 12A-D are exemplary screen shots of a node device running a mesh network communications application. In FIG. 12A, the user is presented with a login screen, which requires the user to enter a username in username box 1202 in order to log in. In embodiments, a username may not be required. A username may be automatically generated and assigned to a user who does not provide a username. In embodiments, a user may select (e.g., by touching, clicking, voice command, to name a few) a log in or sign in option 1203 to instruct the device to log the user into the API.

Figure 12D:
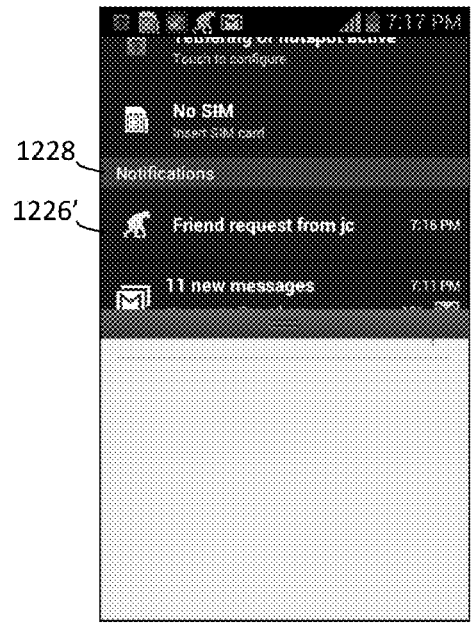

In embodiments, the features discussed with respect to FIGS. 12B and 12C may comprise at least part of a contacts portal 1232 of a communications application. A contacts portal may describe and/or enable interaction with and/or communications with neighboring nodes in a mesh network. In embodiments, neighboring nodes may be nodes that connect indirectly through other nodes in a mesh network. FIG. 12B is a screen shot of a contacts portal 1232 of a communications application. A friends list 1204 may identify online contacts 1206 and/or offline contacts 1208 (collectively, contacts 1207). Contacts 1207 may be other nodes with which communication has been permitted, e.g., accepted by one or both nodes (e.g., the node of FIG. 12 and another node associated with username 1206). In embodiments, the application may indicate online contacts 1206, which may be nodes that are online and/or available for communication, and/or the application may indicated offline contacts 1208, which may be nodes that are offline and/or not available for communication. In embodiments, message indicators 1210 may indicate when new messages, not yet read, have been received from one or more contacts. A message indicator 1210 may indicate the number of unread messages, e.g., "2" unread messages. A mesh network communications application may provide a friend request list 1212, which may list pending contact requests 1214. A pending contact request 1214 may identify a node (e.g., by a username or device address associated with that node) that has requested permission to be a contact 1207. The application may provide a confirm option 1216 for the friend request or a decline option 1218. A mesh network communications application may also provide an online node list 1220, which may list online nodes 1222 that are available for communication and/or to be added as contacts 1207. An add contact option 1224 may be provided to request an online node 1222 to be a contact 1207. Referring to FIG. 12C, after a contact request is sent (e.g. by using an add contact option 1224), a pending contact 1226 may be displayed in the friends list 1204. As shown in FIG. 12D, a contact request notifications 1226' may be displayed in a notifications list 1228, which may be a native feature of a node device.

Figure 13A:
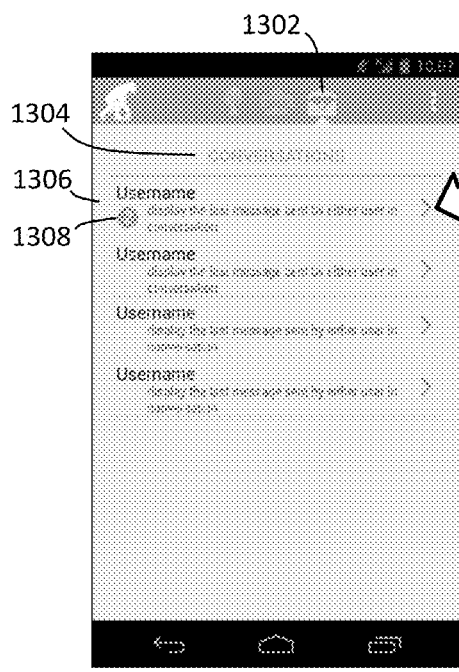
FIGS. 13A-D are exemplary screen shots of an application providing ad-hoc mesh network communications according to an exemplary embodiment of the present invention.
Figure 13B:
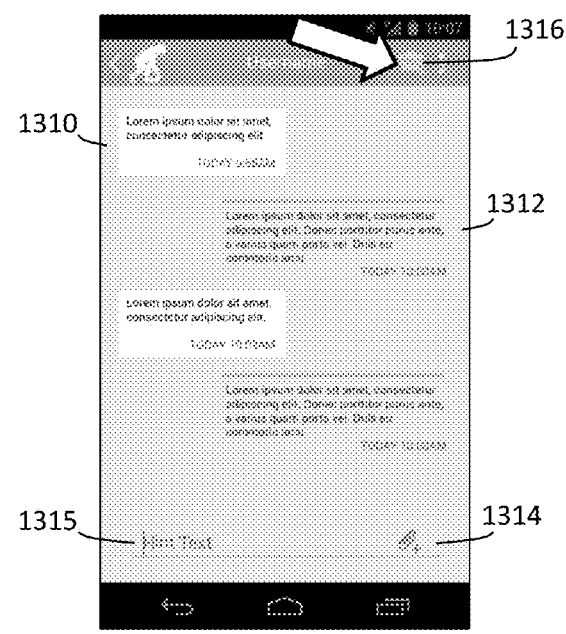
Figure 13C:
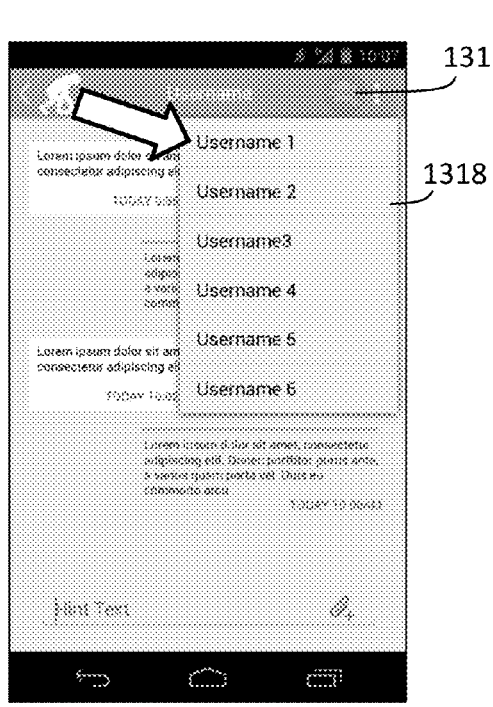
Figure 13D:
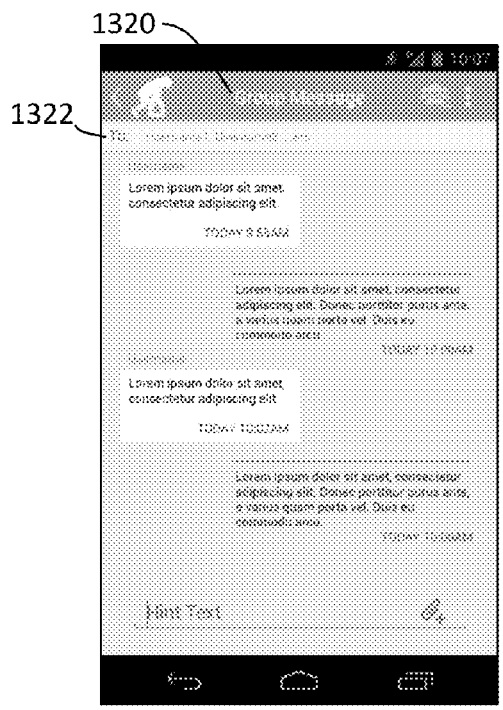

FIGS. 13A-D are exemplary screen shots of a messages portal 1302 of a mesh network communications application on a node device. As shown in FIG. 13A, the main screen of a messages portal 1302 may comprise a conversations list 1304. A conversations list 1304 may list one or more on-going or past conversations, such as conversation 1306. In embodiments, a conversation list 1304 may also indicate which conversations contain unread messages, which indication may include an unread message count 1308. When a user selects a conversation (e.g., conversation with user 1306) from the conversation list 1304, the application may display the conversation, as shown in FIG. 13B. The conversation may comprise received messages 1310 and/or transmitted messages 1312. In addition to the contents of a message, which may comprise text, media works, and/or files, to name a few, a conversation may display the time and/or date on which a message was received or transmitted. An input device, such as a keyboard, may be used to compose a message. In embodiments, a microphone operatively connected to voice-to-speech recognition software may comprise an input to compose a message. A conversation may include an attachment option 1314, which may allow a user to transmit a file, media work, or other data in addition to or in place of a text-based message. A text-based message may be added by selecting a text field location 1315, which may activate and/or display a text input device, such as a touch screen keyboard or keypad. A messages portal may provide the ability to add additional users to a conversation. As shown in FIG. 13B, from within a selected conversation, an add user option 1316 is provided. Referring to FIG. 13C, an add user option 1316 may display available users 1318 who may be added to the conversation. In embodiments, the available users 1318 may be a user's contacts, online contacts, any users in the mesh network with a messaging application installed and/or running, and/or any users in the mesh network, to name a few. In embodiments, the number of participants in a conversation may be limited, e.g., no more than 5 participants in any one conversation. In embodiments, when a third participant is added to a conversation, a group conversation or group message 1320 may be formed, as shown in FIG. 13D. The messages portal of a communications application may provide a participants list 1322, which lists the users participating in a group message 1320.

Figure 14:
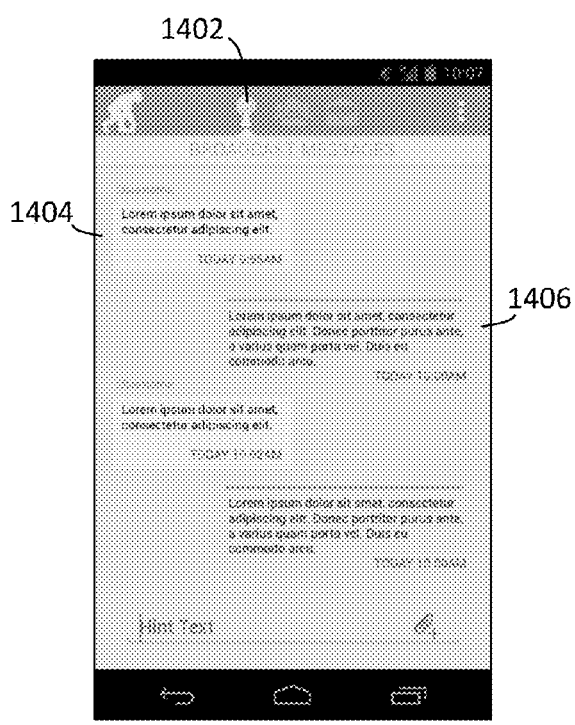
FIG. 14 is an exemplary screen shot of an application for broadcasting communications over a mesh network according to an exemplary embodiment of the present invention.

FIG. 14 is an exemplary screen shot of a broadcast portal 1402 of a communications application. A broadcast portal 1402 may display received messages 1404 and/or transmitted messages 1406. A broadcast portal 1402 may transmit one or more messages and/or data files to all nodes in a mesh network. In embodiments, messages and/or data files from any node in a mesh network may be received at a broadcast portal 1402.

Distributing an API in a Mesh Network

In embodiments, an API for participating in a mesh network may be obtained from a central source, such as an app store (e.g., Google Play, iTunes App Store, Windows Store, to name a few). In embodiments, the API may be provided through a downloadable application, e.g., an application that may be installed on a mobile device.

In embodiments, an API for participation in a mesh network may be distributed through the mesh network. The API may be distributed without a central provider. FIG. 10A illustrates a process for using nodes in a mesh network to distribute an API for participating as a node in the network. In embodiments, the process described in FIG. 10A may be used to distribute an API for a game, for an information platform (e.g., an application for receiving and/or accessing information), and/or for a communications platform, to name a few. At the start, at least one instance of an API or an application embodying the API may be installed or otherwise stored on a first device. The first device may be a mobile device or a non-mobile device. A mobile device may be a cell phone, smartphone, PDA, portable computer, tablet computer, GPS device, portable video game system, calculator device, wall-unit node, DC power node, to name a few. A non-mobile device can include a computer, video game console, wall socket with wireless memory card, DC socket with wireless card, and/or television, to name a few. Although FIG. 10A describes first and second mobile devices, in embodiments, the same process can be performed with a combination of mobile and/or non-mobile devices.

As shown in FIG. 10A, in a step S1002, the presence of a first device may be detected on a second mobile device. In embodiments, the second device may detect a presence of a first device in a network. In embodiments, the second mobile device may detect a presence of a network from a first device. In a step S1004, the second mobile device may wirelessly connect to the first device. In embodiments, the devices may be connected through Wi-Fi, Wi-Fi Direct, Bluetooth, Bluetooth Low Energy, near field communication ("NFC"), infrared, microwave, radio wave, and/or cellular data, to name a few. In a step S1006, a web browser application may be accessed on the second mobile device. In a step S1008, a DNS implementation on the first device may be accessed on the second mobile device. In embodiments, the DNS implementation on the first device may be accessed on the second mobile device through or using a web browser application. In a step S1010, the second mobile device may receive from the first device display data for display in the web browser on the second mobile device. The display data may comprise or may be used to generate a splash screen or other graphical user interface. In a step S1012, the second mobile device may submit an electronic request for a machine-readable API from the first device. The API may be stored in memory of the first device. In a step S1014, the machine-readable API from the first mobile device may be downloaded at the second mobile device. The API may be stored in device memory of the second mobile device. In a step S1016, the machine-readable API may be installed on the second mobile device to be run on a processor of the second mobile device. In embodiments, the second mobile device may include one or more processors, which may be used to run the API. In a step S1018, the second mobile device, using the installed machine-readable API, may connect to the first device. In embodiments, the second mobile device may connect to any other device participating in the mesh network. Devices may use the installed machine-readable API to communicate with other devices in the mesh network. In embodiments, communication, which may be a one or two-way transfer of data packets, may occur after a connection between devices has been established. Communication may also occur without first establishing a connection by relaying data packets through the mesh network, as discussed herein.

In embodiments, an API may be distributed by wall units (e.g., wall-charging units) and/or AC/DC charging units (e.g., in automobiles), which units may contain an API on removable memory. For example, an API may be relayed from wall units to other wall units, and/or from an origin wall unit to any destination device. Such a system may create, propagate, and/or expand a mesh network in the following manner. A second device may detect the presence of a first device. In embodiments, the second device may detect the presence of a first device in a mesh network or may detect the presence of a network from a first device. The second device may connect to the first device via a wireless connection. The second device may send to the first device an electronic request for a machine-readable application programming interface stored in removable memory of the first device. In embodiments, the API may be stored on non-removable memory. The second device may download into second device memory the machine-readable application programming interface from the first device. The second device may install the machine-readable application programming interface to be run on one or more processors of the second device. The second device may then connect to the first device via the wireless connection using the installed machine-readable application programming interface.

Figure 10B:
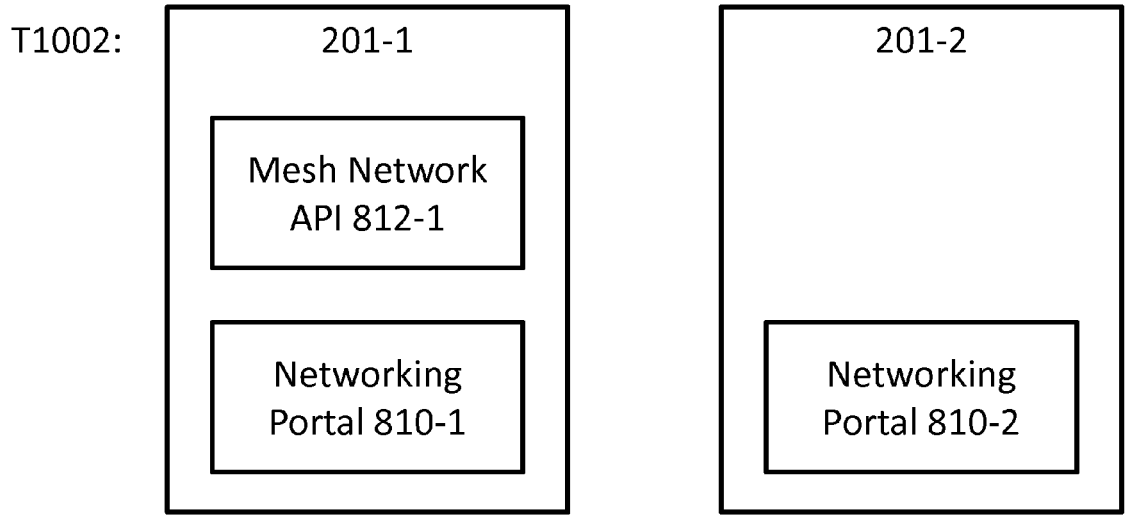
FIGS. 10B-F are schematic diagrams of devices performing a process for distributing an API in a mesh network according to an exemplary embodiment of the present invention.
Figure 10C:
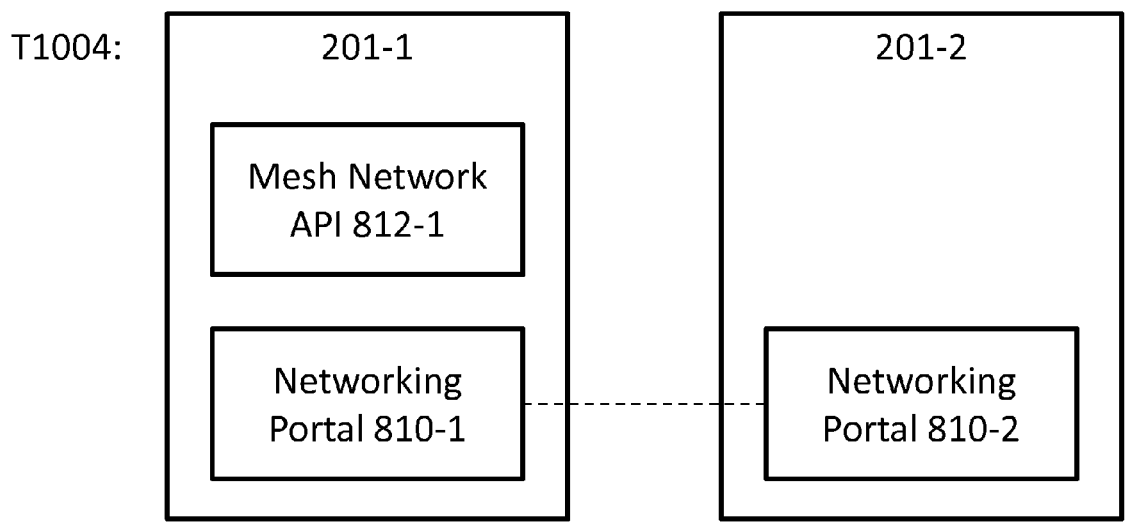
Figure 10D:
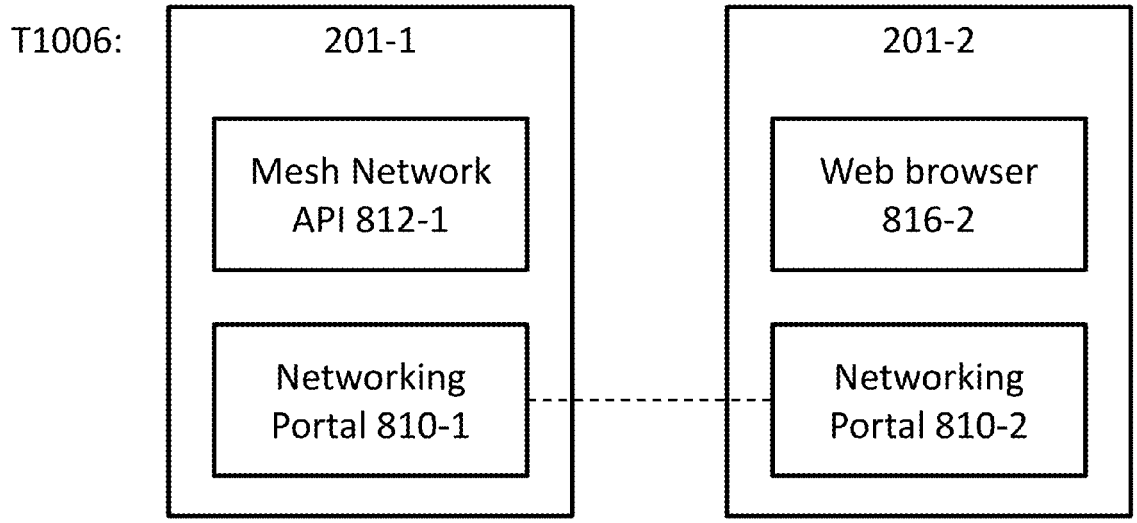
Figure 10E:
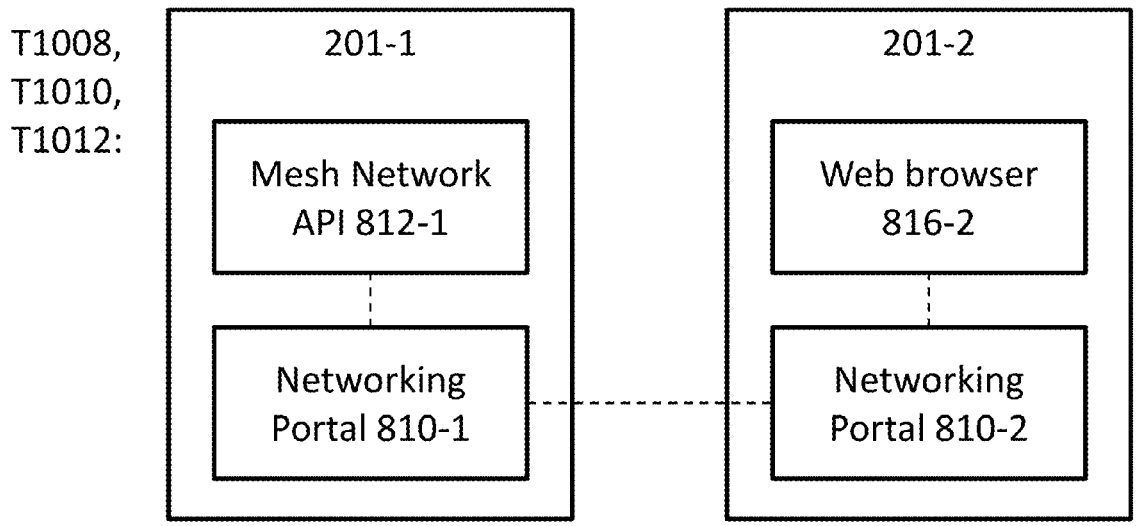
Figure 10F:
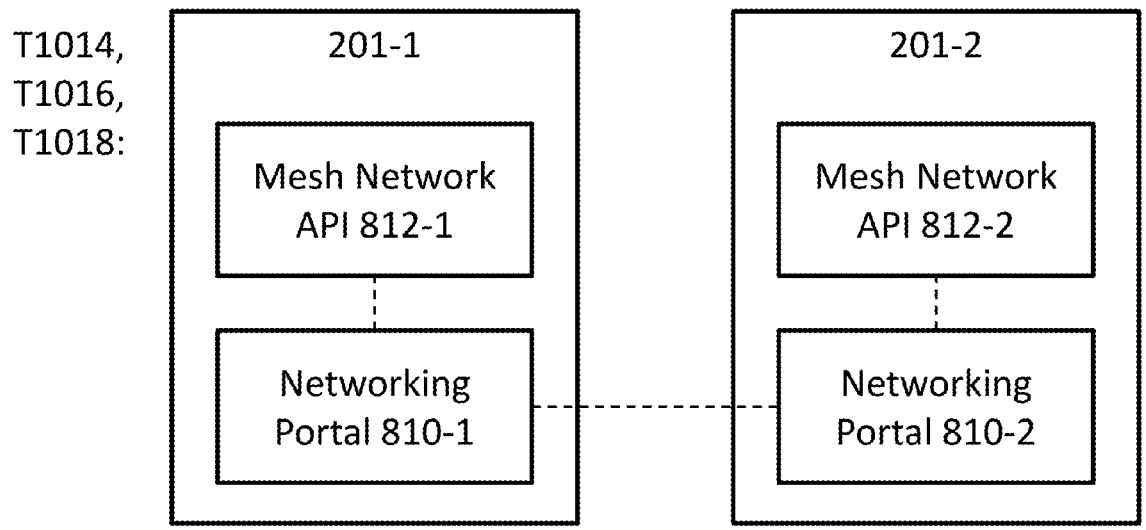

FIGS. 10B-F are schematic diagrams of devices performing a process for distributing an API in a mesh network in accordance with the present invention. Referring to FIG. 10B, at a time T1002, a first node device 201-1 may comprise at least a networking portal 810-1 and a mesh network API 812-1, and a second node device 201-2 may comprise at least a networking portal 810-2. FIG. 10C shows that at a time T1004 the second node device 201-2 may connect to the first node device 201-1. As shown in FIG. 10D, at a time T1006, a web browser 816-2 may be accessed at the second node device 201-2. FIG. 10E shows that at times T1008, T1010, and T1012, the web browser 816-2 on the second device 201-2 may access a DNS on the first device 201-1, receive a download option for a mesh network API, and request the API from the first device 201-1. FIG. 10F shows that at times T1014, T1016, and T1018, the second device 201-2 may download and install, at the second device 201-2, the mesh network API 812-2. The second device 201-2 may then use the installed mesh network API 812-2 to connect with the first device 201-1.

Figure 11A:
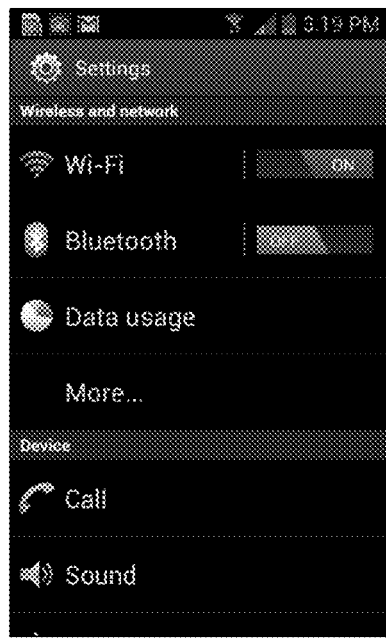
Figure 11B:
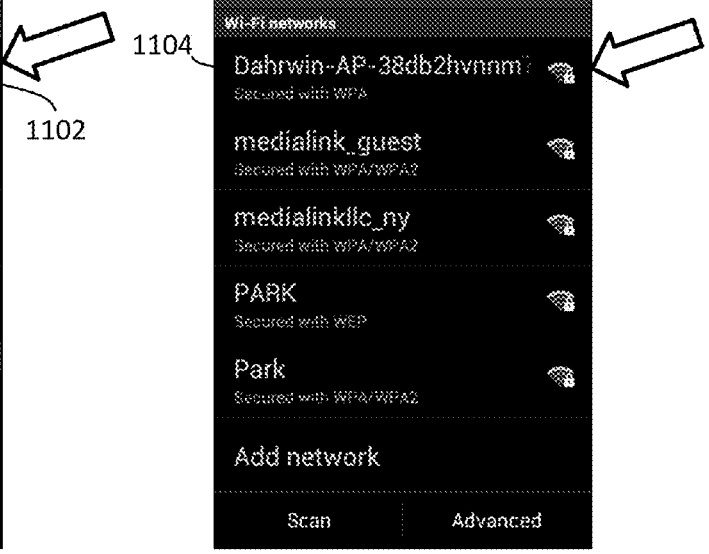
Figure 11C:
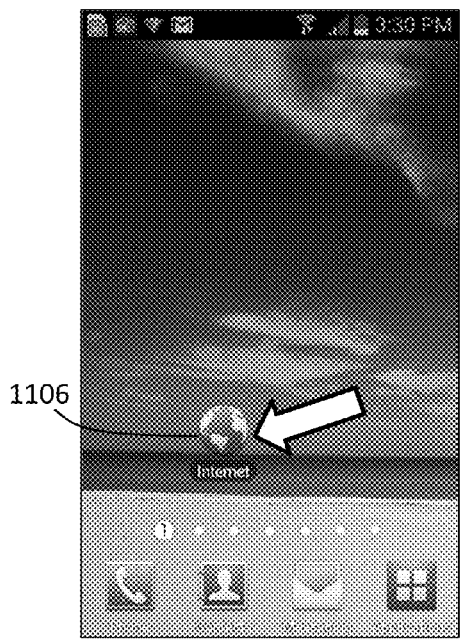
Figure 11D:
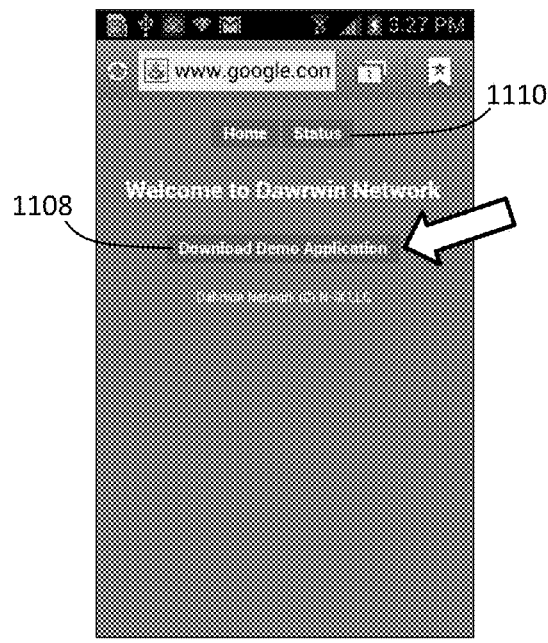

FIGS. 11A-E are screen shots of the implementation of a process for distributing, using a mesh network, an API for participation in a mesh network. In FIG. 11A, in the settings of a second device, the Wi-Fi is enabled, which may be achieved by switching the Wi-Fi selector 1102 to the On position. In FIG. 11B, the available Wi-Fi networks are displayed on the second device. A Wi-Fi network 1104 associated with a first device, e.g., the Dahrwin network, may be selected at the second device. In FIG. 11C, a web or Internet browser 1106 may be accessed on the second device. In FIG. 11D, a splash screen associated with the network of the first device may be displayed in the browser of the second device. In embodiments, the splash screen may contain a download option 1108, e.g., a link, to download and/or run, at the second device, an application, which may comprise an API, from the first device. In embodiments, statistics 1110 about the network of the first device and/or the network status may be displayed and/or made available, e.g. through a link. In FIG. 11E, an application from the first device was downloaded at the second device following a request at the second device to download the application from the first device. A completed download notification 1112 may be provided (e.g., using the API of a device operating system and/or an API associated with a mesh network application, to name a few). The application may then be installed at the second device and used, e.g., to participate in a mesh network. In embodiments, after installing the application at the second device, the second device may perform the steps previously attributed to the first device, such as providing a network and a downloadable application to other devices (e.g., a third device, a fourth device, etc.). In this manner, a mesh network can expand from one device to, in theory, infinitely many devices.

In embodiments an API may be distributed via one or more intermediary devices. For example, an API may be distributed from a first device to a third mobile device via a first connection formed between the first device and a second device and a second connection formed between the second device and the third device. The process may be performed in substantially the same manner as illustrated in FIG. 10A, but with the intermediary devices wirelessly relaying data packets (e.g., electronic requests, display data, API) between the API origin device and the API destination device.

In embodiments, one or more additional APIs may be distributed through a mesh network. For example, additional APIs may provide a gaming platform, advertising platform, communications platform, platform for receiving information, platform for accessing information, social media application, access and/or provide mesh capabilities to any third-party non-mesh applications (e.g., Twitter, Foursquare Facebook, Tumblr, LinkedIn), and/or any mesh network API 812, as discussed herein.

\*\*\*

It will be understood that that any of the above steps and/or elements can be combined, separated, any combination and/or separation thereof, and/or taken in any order. For ease, the steps are described as being sequential and/or in order. This is merely for ease and is not in any way meant to be a limitation.

Now that exemplary embodiments of the present disclosure have been shown and described in detail, various modifications and improvements thereon will become readily apparent to those skilled in the art.

What is claimed is:

1. A method of propagating a mesh network, comprising the steps of:
   (a) detecting, by a second mobile device, a presence of a first device;
   (b) connecting the second mobile device to the first device via a direct neighbor wireless connection;
   (c) accessing, by the second mobile device, a web browser application;
   (d) accessing, by the second mobile device, a DNS implementation on the first device;
   (e) receiving, at the second mobile device from the first device via the direct neighbor wireless connection, first display data for display by the web browser application on the second mobile device;
   (f) sending, from the second mobile device to the first device via the direct neighbor wireless connection, an electronic request for a machine-readable application for establishing mesh network communications that uses an application programming interface, wherein a first instance of the machine-readable application is stored in first device memory of the first device;
   (g) downloading, into second device memory of the second mobile device, a second instance of the machine-readable application from the first device via the direct neighbor wireless connection;
   (h) installing the second instance of the machine-readable application on the second mobile device to be run on a processor of the second mobile device; and
   (i) connecting via the direct neighbor wireless connection the second mobile device to the first device using the installed second instance of the machine-readable application.

2. The method of claim 1, wherein the first display data is used to generate a splash screen on the second mobile device.

3. The method of claim 1, wherein the first device is any of a mobile phone, smart phone, personal digital assistant, wearable electronic device, music player device, calculator device, gaming console, wall-charging unit, DC power node, light bulb, laptop computer, desktop computer, tablet device, interactive appliance, navigation device, drone, and/or interactive billboard.

4. The method of claim 1, wherein the second mobile device is a mobile phone or smart phone.

5. The method of claim 1, wherein the second mobile device is any of a personal digital assistant, wearable electronic device, music player device, calculator device, gaming console, laptop computer, tablet computer, navigation device, and/or drone.

6. The method of claim 1, wherein the direct neighbor wireless connection is created via at least one of Wi-Fi, Wi-Fi Direct, Bluetooth, Bluetooth Low Energy, near field communication, infrared, microwave, radio wave, and/or cellular data.

7. The method of claim 1, wherein the application comprises any of a game, a communications platform, an information access platform, an information receiving platform, an advertising platform, a social media application, and/or a platform to access and/or provide mesh capabilities to non-mesh third party applications.

8. The method of claim 1, further comprising the step of:
   (j) communicating, between the second mobile device and the first device, using the installed machine-readable application.

9. The method of claim 1, further comprising the step of:
   (j) communicating, between the second mobile device and a third mobile device, using the installed machine-readable application.

10. The method of claim 1, further comprising the step of:
    (j) receiving, from the first device at the second mobile device using the installed machine-readable application, an advertisement.

11. The method of claim 1, further comprising the steps of:

(j) detecting, on a third mobile device a presence of the second mobile device;
(k) connecting the third mobile device to the second mobile device via a second direct neighbor wireless connection;
(l) accessing, on the third mobile device, a second web browser application;
(m) accessing, on the third mobile device, a DNS implementation of the second mobile device;
(n) receiving, at the third mobile device from the second mobile device via the second direct neighbor wireless connection, second display data for display by the second web browser application on the third mobile device;
(o) sending, from the third mobile device to the second mobile device via the second direct neighbor wireless connection, a second electronic request for the machine-readable application, the second instance of which is stored in second device memory of the second mobile device;
(p) downloading, into third device memory of the third mobile device, a third instance of the machine-readable application from the second mobile device via the second direct neighbor wireless connection;
(q) installing the third instance of the machine-readable application on the third mobile device to be run on a processor of the third mobile device;
(r) connecting via the second direct neighbor wireless connection the third mobile device to the second mobile device using the installed third instance of the machine-readable application.

12. The method of claim 11, further comprising the step of:
(s) communicating, between the third mobile device and the second mobile device, using the respective installed instances of the machine-readable application.

13. The method of claim 11, further comprising the step of:
(s) communicating, between the third mobile device and the first device, using the respective instances of the machine-readable application.

14. A method of propagating a mesh network, comprising the steps of:
(a) detecting, by a second mobile device, a presence of a first device;
(b) connecting the second mobile device to the first device via a first direct neighbor wireless connection;
(c) accessing, by the second mobile device, a web browser application;
(d) accessing, by the second mobile device, a DNS implementation on the first device;
(e) receiving, at the second mobile device from the first device via the first direct neighbor wireless connection, display data for display by the web browser application on the second mobile device;
(f) sending, from the second mobile device to the first device via the first direct neighbor wireless connection, an electronic request for a machine-readable application for establishing mesh network communications that uses an application programming interface, wherein a first instance of the machine-readable application is stored in first device memory of the first device;
(g) downloading, into second device memory of the second mobile device, a second instance of the machine-readable application from the first device via the first direct neighbor wireless connection;
(h) installing the second instance of the machine-readable application on the second mobile device to be run on a processor of the second mobile device; and
(i) connecting via a second wireless connection the second mobile device to a third device in the mesh network using the installed second instance of the machine-readable application.

15. The method of claim 14, further comprising the step of:
(j) communicating, between the second mobile device and the third device, using at least the installed second instance of the machine-readable application.

16. A method of propagating a mesh network, comprising the steps of:
(a) detecting, on a second device, a presence of a mesh network from a first device;
(b) connecting the second device to the first device via a direct neighbor wireless connection;
(c) sending, from the second device to the first device via the direct neighbor wireless connection, an electronic request for a machine-readable application for establishing mesh network communications, the machine-readable application comprising an application programming interface, wherein a first instance of the machine-readable application is stored on removable memory operatively connected to the first device;
(d) downloading, from the first device into second device memory of the second device, a second instance of the machine-readable application;
(e) installing the second instance of the machine-readable application on the second device to be run on a processor of the second device; and
(f) connecting, via a wireless connection, the second device to the mesh network using the installed second instance of the machine-readable application.

17. The method of claim 16, wherein the first device is a gaming console, wall-charging unit, DC power node, light bulb, desktop computer, interactive appliance, navigation device, drone, and/or interactive billboard.

18. The method of claim 16, wherein the second device is any of a mobile phone, smart phone, personal digital assistant, wearable electronic device, music player device, calculator device, gaming console, wall-charging unit, DC power node, light bulb, laptop computer, desktop computer, tablet device, interactive appliance, navigation device, drone, and/or interactive billboard.

19. The method of claim 16, wherein the removable memory operatively connected to the first device comprises any of an SD card, Micro SD card, USB drive, flash memory device, and/or solid state memory device.

20. The method of claim 1, wherein the application programming interface of the machine-readable application provides mesh capabilities for participation by the first device and the second mobile device in the mesh network.

21. The method of claim 14, wherein the application programming interface of the machine-readable application provides mesh capabilities for participation by the first device and the second mobile device in the mesh network.

22. The method of claim 16, wherein the application programming interface of the machine-readable application provides mesh capabilities for participation by the first device and the second mobile device in the mesh network.

* * * * *